Nov. 3, 1959        J. C. BELLAMY        2,911,277

SYSTEM AND APPARATUS FOR DATA PROCESSING

Filed July 10, 1953        11 Sheets-Sheet 1

INVENTOR.
John C. Bellamy

Nov. 3, 1959  J. C. BELLAMY  2,911,277
SYSTEM AND APPARATUS FOR DATA PROCESSING
Filed July 10, 1953  11 Sheets-Sheet 2

INVENTOR.
John C. Bellamy

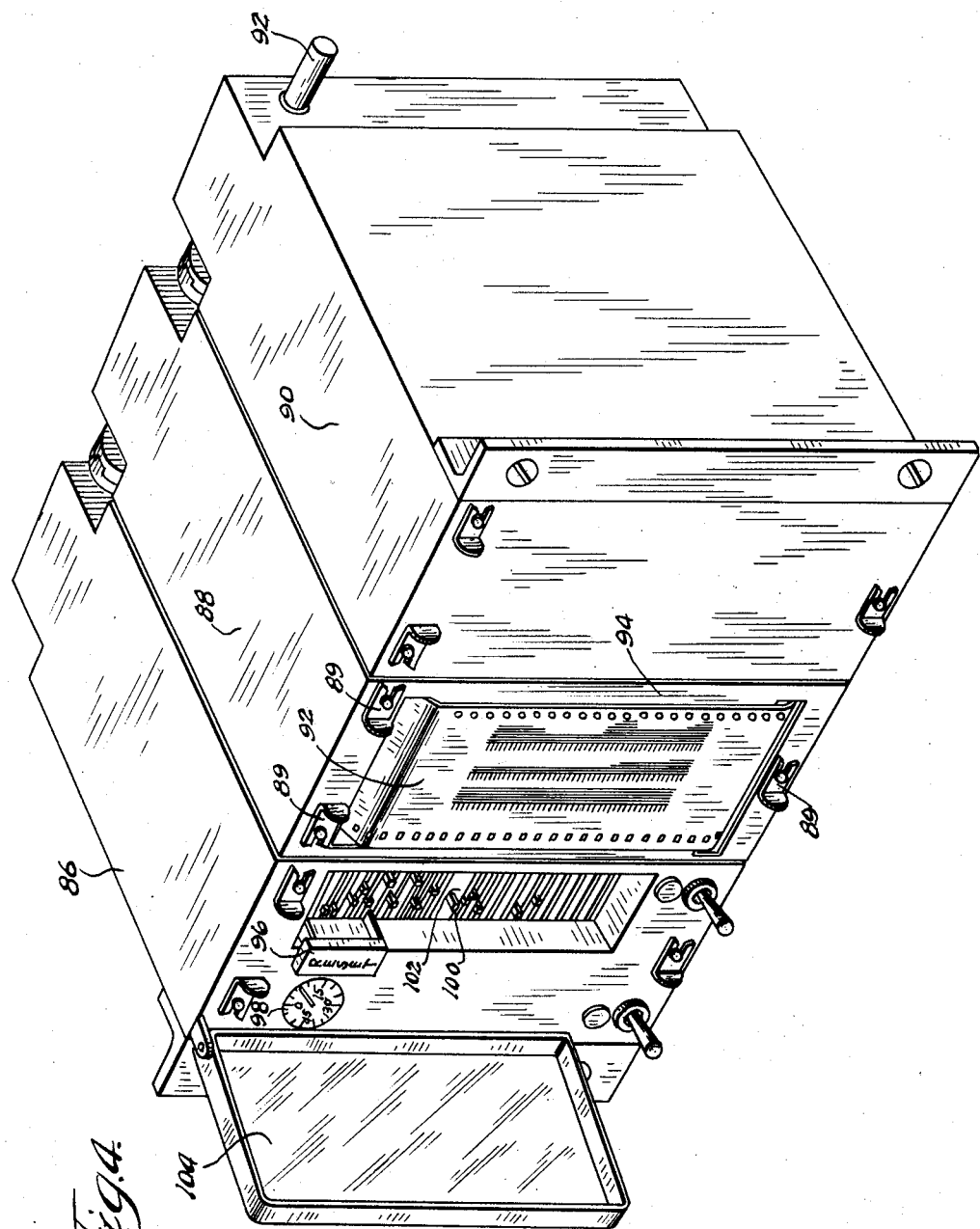

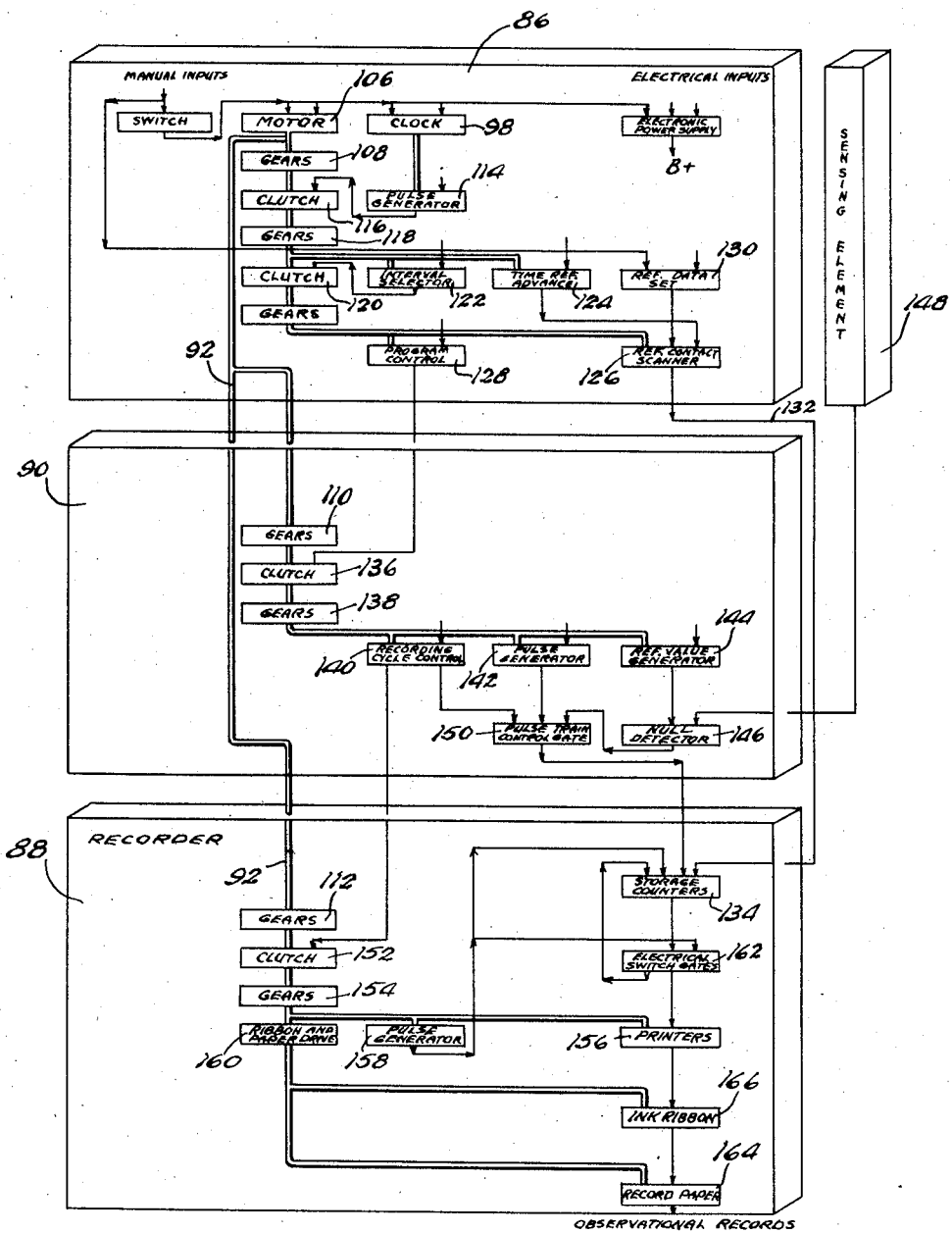

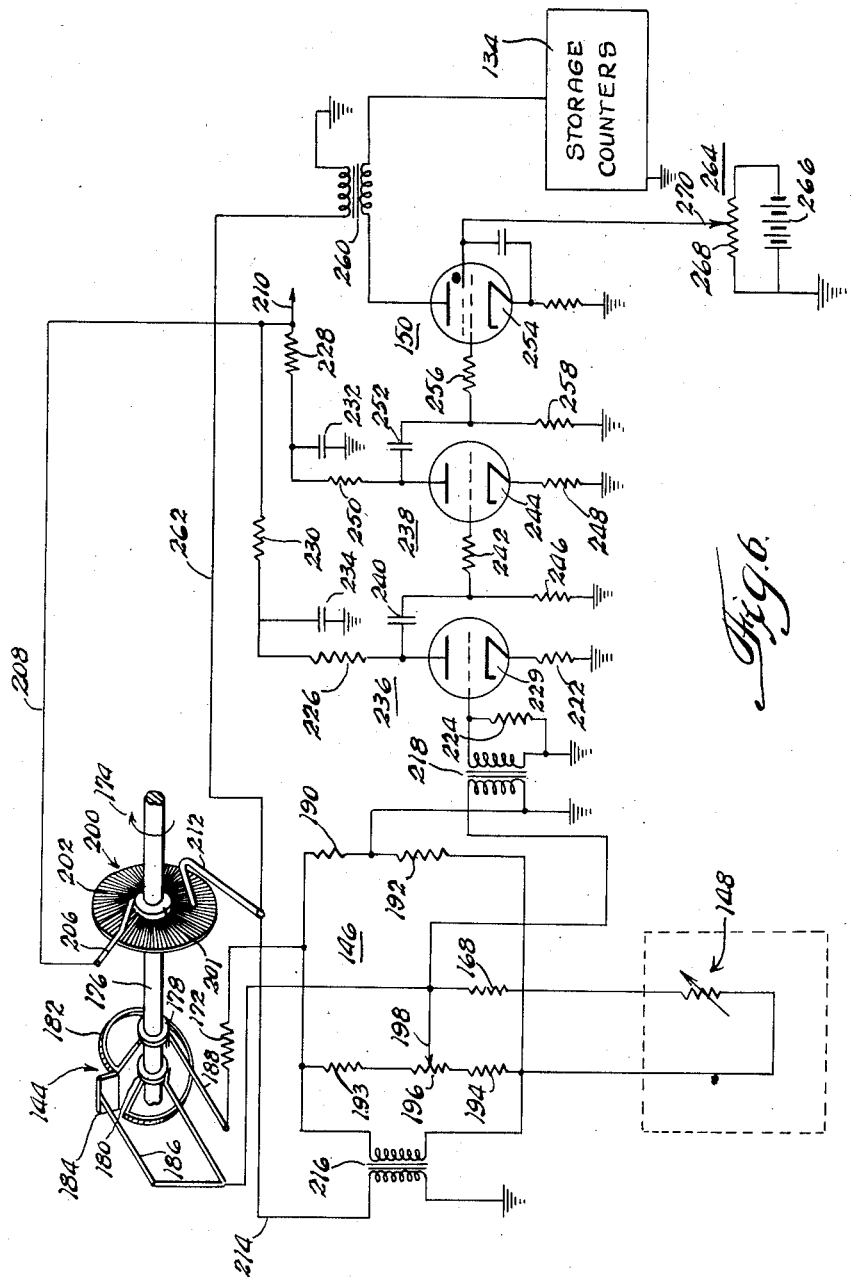

Nov. 3, 1959
J. C. BELLAMY
2,911,277
SYSTEM AND APPARATUS FOR DATA PROCESSING
Filed July 10, 1953
11 Sheets-Sheet 6
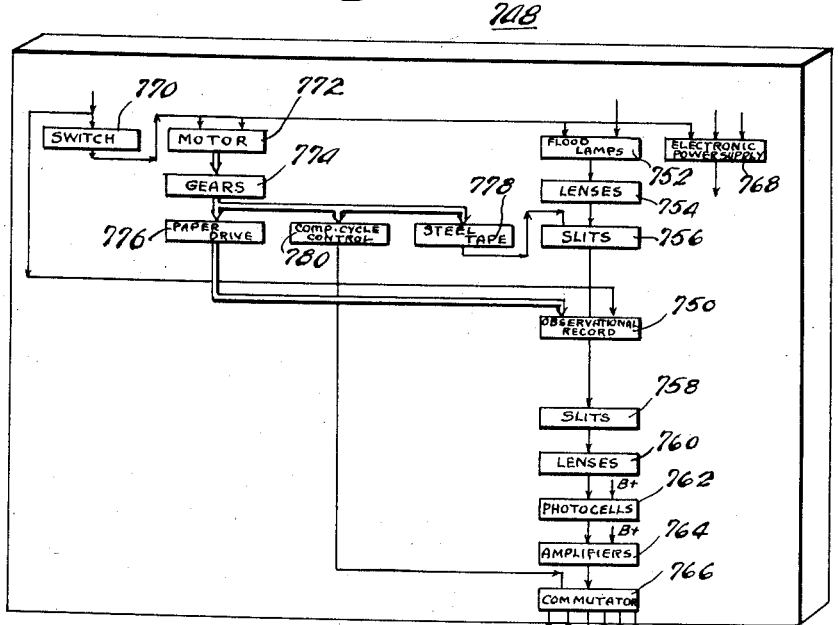
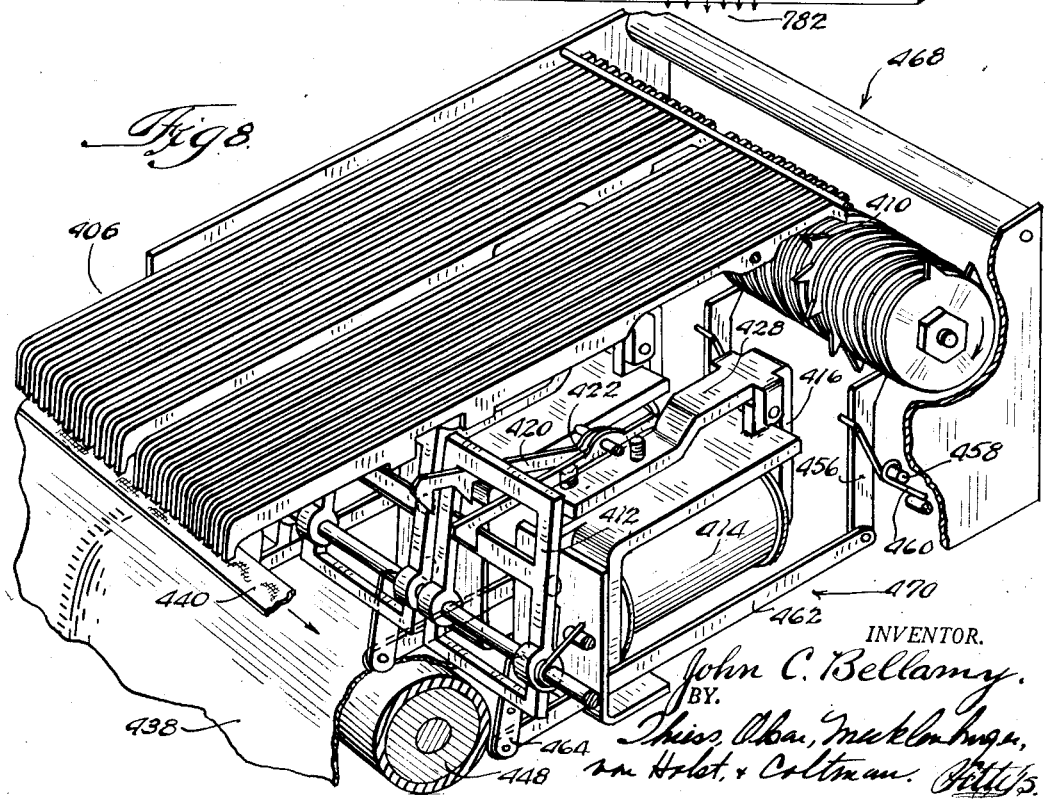
INVENTOR.
John C. Bellamy Nov. 3, 1959    J. C. BELLAMY    2,911,277
SYSTEM AND APPARATUS FOR DATA PROCESSING
Filed July 10, 1953    11 Sheets-Sheet 7
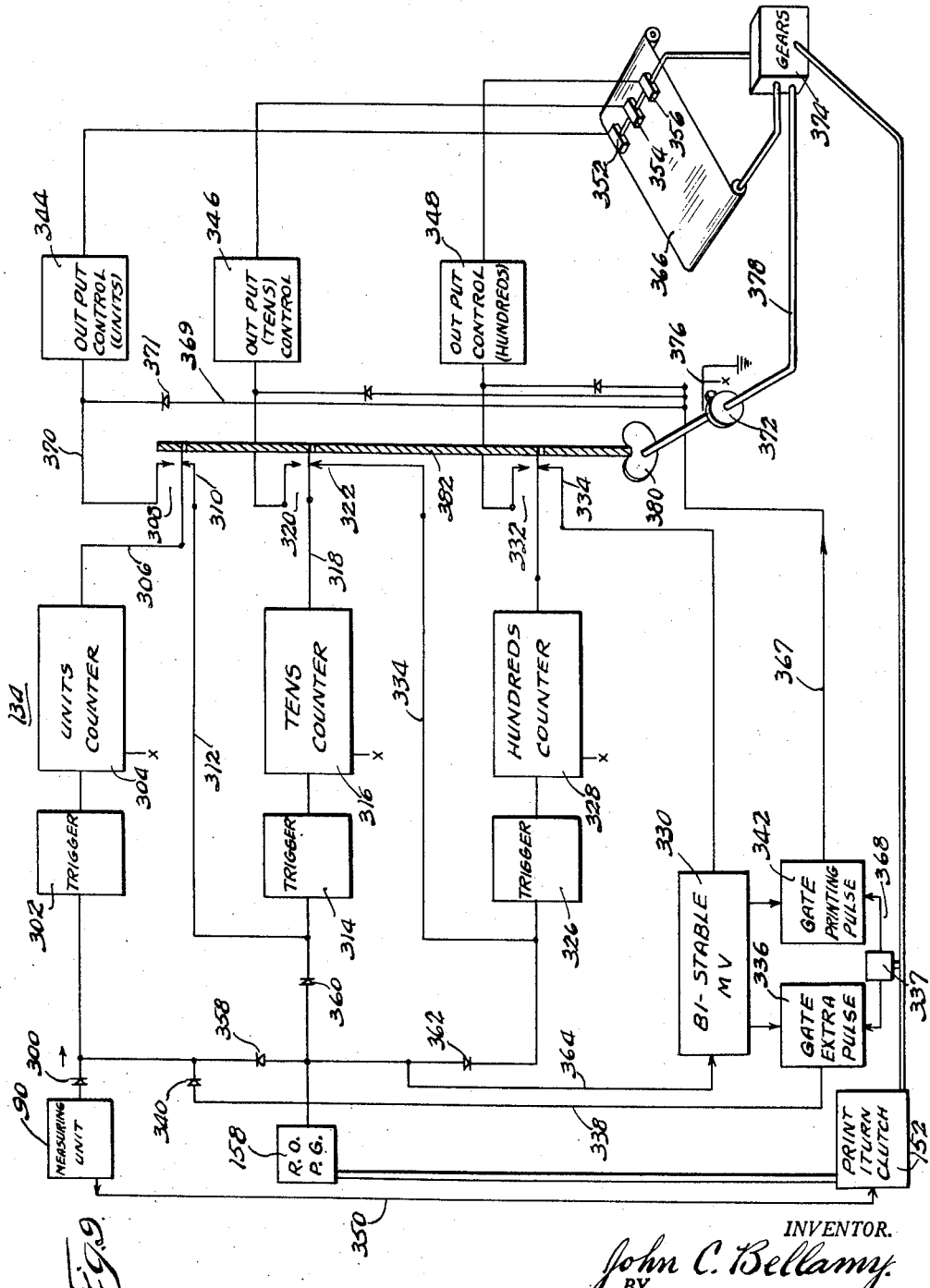
INVENTOR.
John C. Bellamy

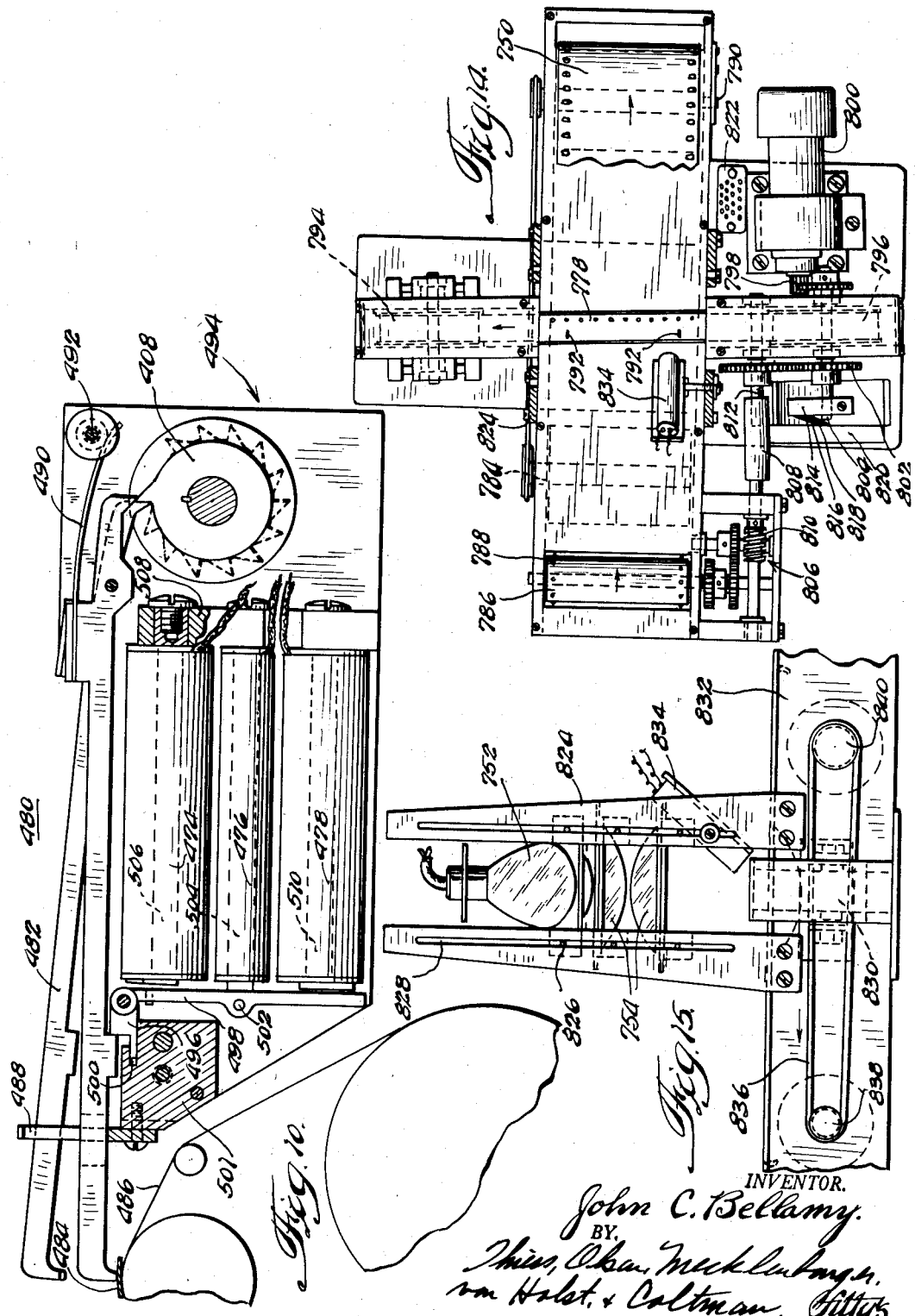

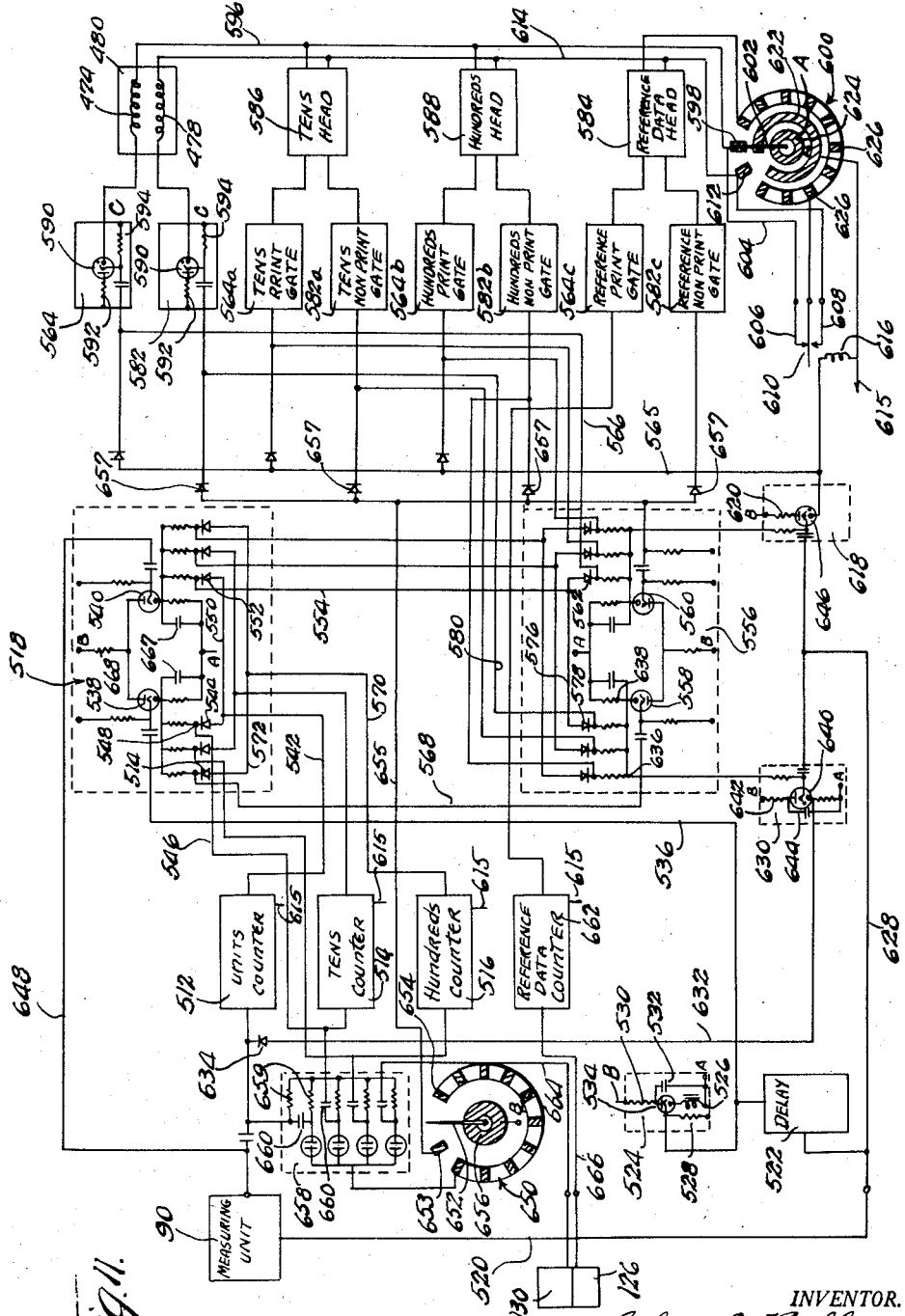

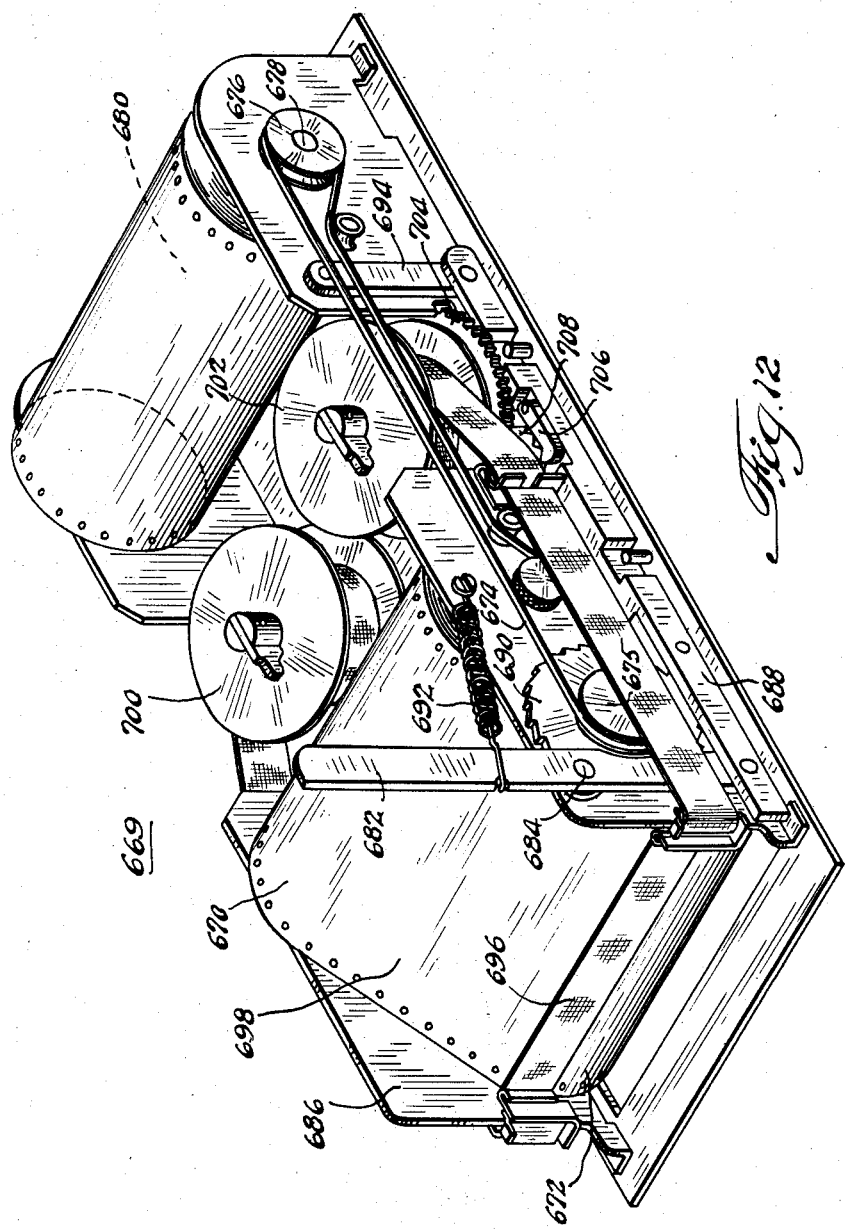

Nov. 3, 1959  J. C. BELLAMY  2,911,277
SYSTEM AND APPARATUS FOR DATA PROCESSING
Filed July 10, 1953  11 Sheets-Sheet 11

INVENTOR.
John C. Bellamy.
BY

United States Patent Office 2,911,277
Patented Nov. 3, 1959

2,911,277

SYSTEM AND APPARATUS FOR DATA PROCESSING

John C. Bellamy, Barrington, Ill., assignor, by mesne assignments, to Cook Electric Company, Chicago, Ill., a corporation of Delaware Application July 10, 1953, Serial No. 367,326

28 Claims. (Cl. 346—33)

This invention relates to data processing and more particularly to a system, method, and apparatus for recording, reproducing, and processing data.

Accordingly, it is a principal object of this invention to provide an improved data prcessing system and record form.

It is another object of this invention to provide an improved system for remotely sensing and registering data whereby such data may be utilized at a central station either for making a permanent record or for various computational operations.

It is another object of this invention to provide an improved method of data processing for recording and reproducing numerical data rapidly and accurately.

It is still another object of this invention to provide an improved data system utilizing a record medium requiring minimum storage space and adapted for ease of manipulation both in recording and playback.

For purposes of definition and simplification, the term "data" is defined to include all information or intelligence; for example, original observations, calculations, analyses, functional relationships, parameters, notations of any type whether in graphical, analogue, phonetic, or other form.

An ideal system for data recording should possess a plurality of characteristics which adapt the system for use under varying conditions. Such a system should utilize a record which may be generated by automatic, semiautomatic, and manual means. The record should be readily readable both by automatic means in either a digital or analogue form and by visual means.

The system should be adapted for reading a series of data elements as they are aligned on a record element seriatim, or it should be possible to read out a preselected data element from any point in the series. The recording system should, furthermore, economically utilize the record medium and require the minimum equipment both for recording and reading the intelligence. The system should utilize a record which has both phonetic and scalar expression and one which is adapted for direct utilization as a vector representation.

No system heretofore known has possessed all of these characteristics. Arabic notation possesses a high degree of phonetic and manual readability, but it is virtually impossible to read such notation by any automatic means or to use Arabic numerals in a vectorial or scalar representation. Although preprinted grid graphs may be sensed by automatic means with reasonable accuracy they are not adapted for rapid conversion into a voltage analogue. Such a preprinted grid graph does not economically utilize the record material and requires excessive space for data storage.

Other known systems of recording and reproducing data utilize effects such as punched holes or superimposed marks having coded positions to indicate magnitudes of which a permanent record is desired. In these systems, one or more effects in predetermined positions represent each digit in the particular number system employed, and thus the playback device must be capable of detecting not only the mere presence or absence of the effect but also the exact position of the effect relative to a predetermined datum. The individual effects and the various coded positions must be spaced apart substantially to provide sufficient resolution for a mechanical or electrical system to accurately reproduce the data stored. Such a system using coded positions possesses little or no phonetic or scalar quality and thus cannot readily be utilized for manual interpretation. A positional code has the further disadvantage of requiring a positively established datum and is thus inapplicable for vector representation.

The special use to which such a coded system is adapted depends primarily upon the radix which is utilized. The binary code, using the radix 2, has no phonetic meaning at all, as it is necessary to convert the number which appears into a decimal number using the radix 10. The binary system, however, possesses the advantages of good space utilization and easy recording and reproduction with well known "flip-flop" circuits and binary counters. A coded punching system based upon the decimal system, radix 10, has the advantage of greater readability but the accompanying disadvantage of very poor space utilization.

Data has also been recorded heretofore by utilizing an effect varying in density, area, or frequency. Such records have substantially no phonetic or scalar quality and are completely unadaptable to a system of vector representation. Such systems need some standard or datum from which the analogue value can be computed, and this necessarily involves the recording of a special reference signal or the exercise of extreme care in the design of the mechanical and electrical apparatus utilized in recording and playback.

Therefore it is a further object of this invention to provide a system, method, and apparatus for creating a universal record which will be susceptible to convenient direct transfer of the data by means of automatic readers into electronic or mechanical counters or computers, into proportional values of electrical voltages or shaft positions, or into simple devices for selection of desired conditions or records, and which may readily be converted by means of manual viewing of the record into speech or common symbolic notation, or into immediate mental concepts of positions, variations, interrelationships, trends, sharp discontinuities, and the like.

It is still another object of the invention to provide a system, method, and apparatus for producing a record of data with one of the following: (1) automatic recorders utilizing automatic intelligence inputs; (2) manually operated recording machines such as typewriters, simple manual printers, printing computation equipment, and the like; or, (3) by manually writing with a pencil or other writing implement.

It is a further object of this invention to provide a system, method, apparatus, and record form having direct applicability for recording data of singular values such as description or identification of a particular machine; of successive discrete values of an intermittently determined phenomenon such as date, time, or the like; and of continuously varying intelligence such as temperature, altitude, humidity, and the like.

It is another object of this invention to provide a recording system and record susceptible to convenient operational and combinational interpretation of data elements as scalars, as in the summation of temperature and dew point, or as vectors, as in the components of a two-dimensional vector such as wind or a three-dimensional vector such as space position.

It is another object of this invention to provide apparatus for producing a record capable of accuracies and resolutions up to one part in one million with a minimum of required recording area.

It is another object of this invention to provide apparatus and a record by which a convenient automatic or visual location and selection of any desired data increment may be accomplished either immediately after recording or from a large volume of accumulated records.

It is another object of this invention to provide an improved method and apparatus for recording positive and negative numbers and the sign of a given data element for sensing either manually or automatically.

It is a further object of this invention to provide recording apparatus wherein the resulting record is immediately visible and a portion thereof remains visible.

It is still another object of this invention to provide an improved method and apparatus for increasing the range of data values recordable upon a given record area by creating a plurality of effects in a row, each representing a data increment, the total number of effects indicating the data value and the direction of the row indicating a range of values recorded.

Further and additional objects of this invention will become manifest from a consideration of this description, the accompanying drawings, and the appended claims.

This invention is a variation and further development over the disclosure of application Serial No. 278,038, John C. Bellamy, now abandoned, entitled "Improved System, Method and Apparatus for Processing Data or Information," filed April 15, 1952, and assigned to the same assignee as the present invention. Therein a system, method, and apparatus is disclosed and claimed for utilizing a record comprising groups of discrete effects indicative of a data value in which the total number of effects in a given group defines the magnitude of that particular data element or sample.

In one form of this invention a new record is provided which utilizes a plurality of distinct and detectable effects disposed in rows transverse to the longitudinal axis of a strip of recording material, whereby each distinct effect represents a predetermined data increment and the data contained in each row of effects may be sensed and utilized arithmetically in subsequent data processing. Moreover, the effects in each row are segregated into groups wherein the number of effects in any given group corresponds to a particular number, and the position of each group in a row indicates the position of the digit in the number represented by the row. It should be apparent, that each of the groups in a given row represents one decimal digit and that within each group, the data is unitized and the number of effects in the group represents the data magnitude divided by the radix of the system, which in decimal notations is 10, raised to a power equal to the digit position minus one.

More particularly, if the range of data to be recorded is, for example, known to be between the limits of zero and 1000, a unitary decimal digital record of data variations may be made using a plurality of parallel rows of effects, each of said rows having three groups therein. As an example of the type of data generally to be recorded, it is often desirable to make and record meteorological determinations of prevailing conditions during an aircraft flight. One such condition, namely, temperature, varies generally within the range of −100° to 100° C. Therefore, in utilizing this system a sensing device periodically determines the temperature of the air surrounding the aircraft and converts the temperature measurement into an electrical analogue (in this apparatus a series of pulses or effect) which, in turn, is transduced and recorded upon the record medium of this invention in parallel rows of grouped effects.

The first group of effects in each row may be called the units group, and the number of effects may vary between zero and nine. Each effect in this group will represent a 1° temperature increment, and if no effects appear in any of the remaining groups of the row a mere counting of the effects in the units group will determine the ambient temperature. Therefore, if eight effects appeared in the units group, an observer would immediately note that the temperature of the ambient air is 8°.

Adjacent to the units group in each row, and preferably to the left for the usual left-to-right visual interpretation, appears a tens group. Each effect appearing in this group denotes a 10° increment of temperature. For example, if two effects appeared in the tens group along with eight effects in the units group, an observer would immediately recognize that the ambient temperature was 28°. The maximum range of this two-group record would be 99°. However, it might often be desirable to provide a third group in each row of effects corresponding to the hundreds digit, whereby one effect in this group would represent a 100° data increment which would normally be positioned to the left of the tens group, or it might be desirable to determine data such as temperature within closer limits than that above described, in which event an additional group of effects could be utilized to register, for example, tenths of degrees, this group normally being positioned to the right of the units group. If such an additional group is employed in the above temperature example, three effects in the tenths group would immediately indicate that the temperature was 28.3°.

It will generally be desirable, in making such a record, to align all of the effects in a given group along a segment of the straight line defining the row. Furthermore, for clarity, it is considered desirable to have the groups which appear in a row represent the sequence of digits in the sample as they would appear when written in the Arabic form.

One particular apparatus for utilizing this new record form is shown and described herein. This new record form will be found useful for permanently preserving large amounts of data for future use and will also be especially well adapted as an intermediate step in a data recording and processing procedure in which it is desirable to have an extremely small, lightweight apparatus included within an aircraft, radiosonde device, or the like which may be used to produce an arithmetically accurate record which may be immediately transposed into a preferred permanent form when the vehicle reaches a central recording station. As an example, at the end of an aircraft flight the data which is generated by the small lightweight apparatus to be described may be immediately transformed into a standard record form, such as a teletype tape, IBM card, or the like. Thus it is clear that the sensing, recording, and playback elements described hereinafter are all parts of a single system necessary for the economical and convenient accumulation of data while in flight for subsequent permanent recordation in any of the well-known forms. This record form is also well adapted for the storage of known functions and variables which may be desired in periodic computational operations. As an example, it may be desired to maintain a permanently available unitary decimal digital record of the trigonometric function in degrees or tenths of degrees, or an exponential or hyperbolic relationship. In short, the functional relationships between variables may be recorded in permanent form on this record for subsequent use either in automatic devices or for manual interpretation.

As described in more detail hereinafter, the apparatus for making the above-described record comprises means for generating an electrical analogue of any given type of data, such as temperature, humidity, altitude, velocity, acceleration, units per minute, or the like, means for creating a series of pulses from this electrical analogue wherein the number of pulses represents the total data magnitude, and each of the pulses represents an incremental element of the data. These pulses are then transmitted to apparatus for producing a response or register in a counting circuit associated with each digit representing the data value. A plurality of mechanical printing heads associated with each digit position are then actuated by a continuously rotating cam to sequentially move a plurality of printing arms in each printing head towards a printing position. An interference bar is disposed on each head in the path of the printing arms to prevent an effect from being imposed upon an associated record medium. Said interference bars are then moved to a print position in accordance with the response above described, which corresponds to the values of the various digits. The interference bar is actuated by a control pulse generated by the associated digit counting circuit. A further pulse is generated each time a printing arm is actuated, said pulses being fed to the associated counting circuit. A total of 10 pulses are available for each printing head. Each head has 11 printing arms. If in a given group, the number "3" is to be recorded, the continuously rotating cam will rotate through a portion of its complete revolution sufficient to generate 7 readout pulses and actuate 7 printing arms before the interference bar, in response to the data value, moves to the print position. At this time the remaining 4 printing arms will be actuated to cause three effects to be imposed upon the record medium along with a data element identifying indicia.

Thus, by having a plurality of identical heads, each with a rotating cam and a predetermined number of printing arms, a record may be made of a number having more than one digital position. Each of the printing heads will have an independent interference bar actuated from a register counting circuit which contains a record of the value or magnitude of the particular digital position being recorded. All of the cams of the various printing heads will be rotated in synchronism, and the time at which the various interference bars are moved to the printing position will determine the number of printed effects in the associated group. In the event that a negative number is to be recorded, the interference bar of each printing head is initially shifted to the printing position, and thus the printing arms produce effects beginning with an identifying indicia positioned along the edge of the digit group opposite the edge where the indicia marking a positive group would appear. The arms continue to print until a control pulse is received which will terminate the recording at an appropriate time such that the number of effects in each group represents a corresponding digit magnitude.

The data which is stored upon the record medium will be sensed by an appropriate playback device, and the device hereinafter shown and described is merely exemplary of one possible means for converting the recorded data into a form whereby it may be utilized to create either a record form of the more conventional variety or a source of analogue or digital signal for computational equipment. The playback here utilized comprises generally a closed metallic band having a slit therein corresponding in size to a single effect; the band is driven across the record with a light source positioned thereover to produce a series of light pulses on a photoelectric cell corresponding to the effects on the record.

By using a commutator in conjunction with the photocell output, the effects or pulses in the various groups are segregated and may readily be recombined into a single analogue representing the entire data value.

For a more complete understanding of the invention, reference should be made to the accompanying drawings, wherein Figure 1 illustrates the relationship between a typical line graph record, Arabic notation, and the unitary decimal digital system of notation;

Fig. 4 is a pictorial view of the complete recording apparatus of one embodiment of this invention adapted for typical rack mounting in aircraft;

Fig. 5 is a block diagram of the recording apparatus of Fig. 4;

Fig. 6 illustrates one means for converting a measured quantity of any type into an electrical analogue and, in turn, into a series of unitary pulses;

Figure 7 is a view in elevation of one printing head which may be incorporated in the apparatus of Fig. 4;

Fig. 8 is an isometric view of three of the printing heads of Fig. 7 assembled into a three-digit recorder;

Fig. 9 is a schematic block diagram of the recorder portion of the block diagram of Fig. 5 illustrating the manner in which data is converted from unitary pulses into a unitary digital printed form;

Fig. 10 illustrates an alternate embodiment of the printing head of Fig. 7;

Fig. 11 is a circuit diagram of apparatus similar to that disclosed in Fig. 9 and adapted for use with the alternate head embodiment of Fig. 10;

Fig. 12 illustrates the carriage for the record paper and printing ribbon of the recorder of Fig. 4;

Fig. 13 is a block diagram of one embodiment of this invention adapted for playback of the record illustrated in Figs. 2 and 3;

Fig. 14 is a plan view of the record playback mechanism utilized in the diagram of Fig. 13;

Fig. 15 is a partial view in elevation of the playback apparatus of Fig. 14.

Figure 1:
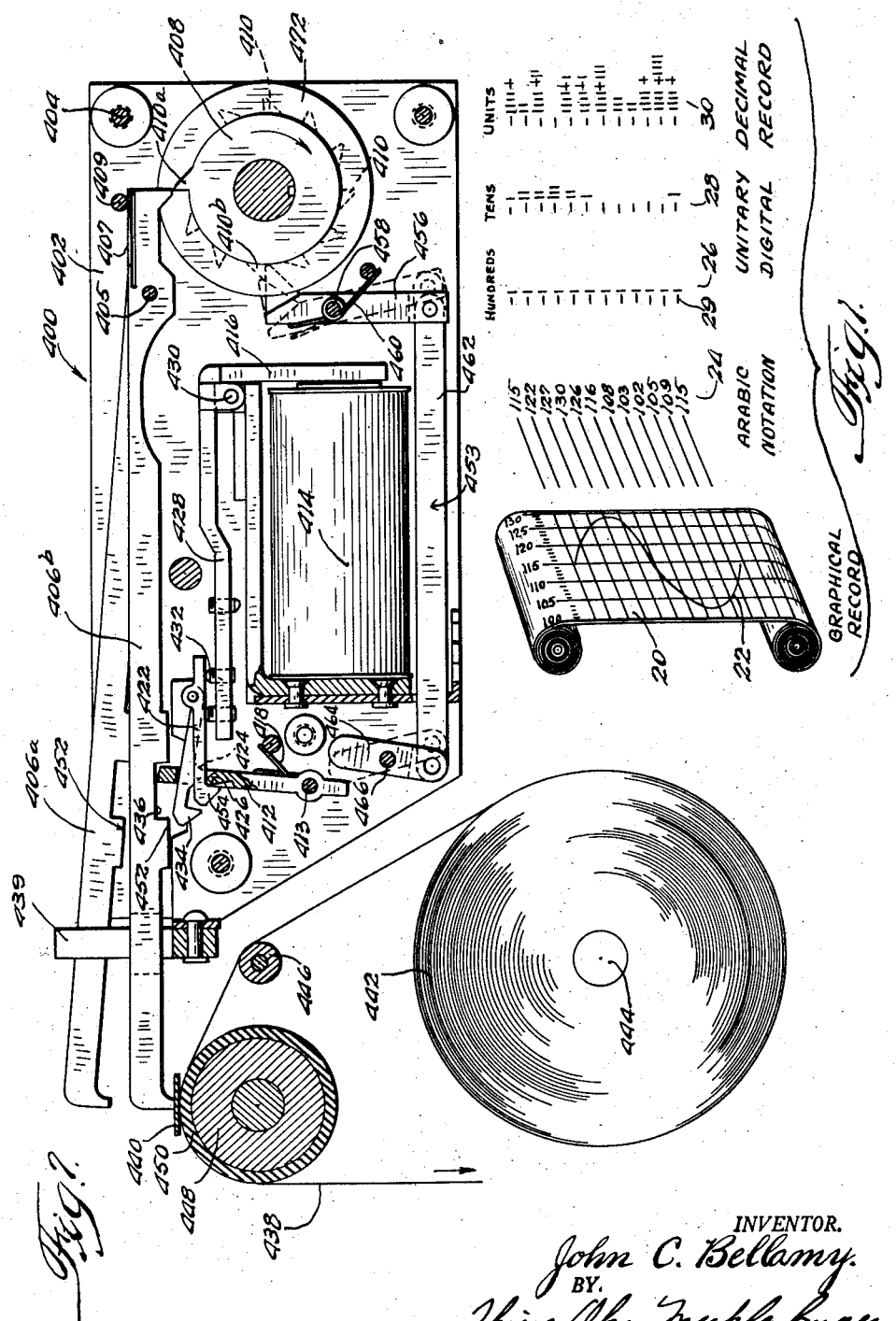

Referring now to the drawings, and more particularly to Fig. 1, a record medium 20 is illustrated having a typical cosine wave 22 printed thereon. This is merely exemplary of one well-known record form, and the scale of the record has been assigned arbitrary data values varying from 100 to 130. At twelve selected points along the record the data has been converted into Arabic values illustrated in the column 24, and it can there be seen that the data values vary from the central value 115 up to a maximum 130 and thence to a minimum 102 in the second half cycle and returning to the mean value of 115. This variation is illustrated in unitary decimal digital form in the three columns 26, 28, and 30, wherein it can be seen that the data values may visually be read in the customary manner from left to right, each of the data values having a single mark in the hundreds column 26, indicating 100, and one, two, or three marks in the tens column 28, indicating variations between 10 and 30, and a plurality of marks in the units column 30 varying between zero and nine, which indicates the value of the Arabic number appearing in the third or units position. Thus the first unitary decimal digital record would be read as one hundreds effect, one tens effect, and 5 units effects, or 115. The horizontal effect 29 along the left edge of each digit group identifies a data element and also indicates a positive value.

Figure 2:
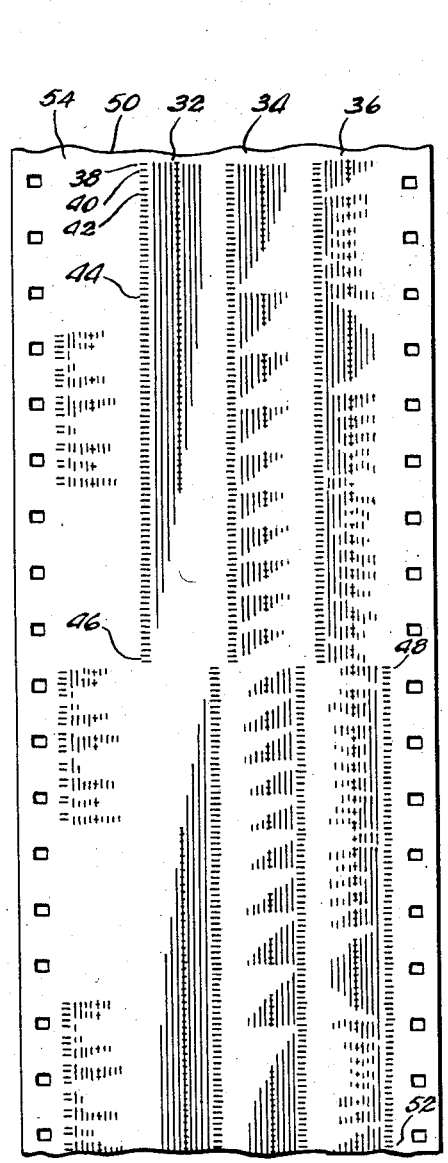
Figure 2 illustrates a typical record generated by the apparatus disclosed by this invention, showing a continuously increasing data value.
Figure 3:
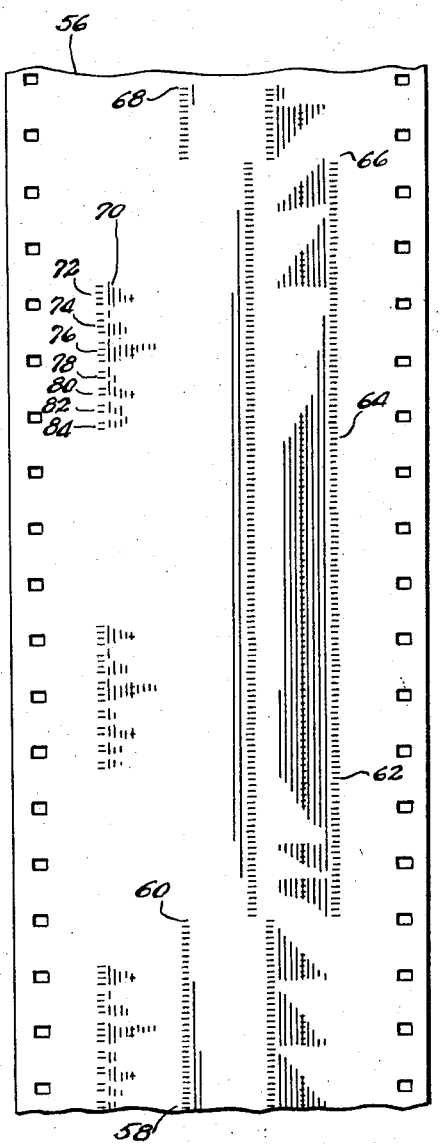
Figure 3 illustrates another record which would be typical of the temperature variations as recorded during a short flight.

Typical records which have been made according to this invention are illustrated in Figs. 2 and 3 somewhat enlarged. The record of Fig. 2 comprises three data channels 32, 34, and 36, which correspond, respectively, to the tenths, hundredths, and thousandths position in the decimal system. One data element consists of a row taken transversely across the record medium aligned with one of the indicia 38, each of said indicia indicating an independent data value. By utilizing such a row of indicia it is possible to compress a greater amount of data upon a given length of record material by allowing the unitary effects to merge into a solid continuous line.

The indicia 38 serve the second purpose of distinguishing between positive and negative numbers.

In Fig. 2 the data value printed upon the record medium at the position indicated by the indicia 38 is equal to .999, as indicated by the nine detectable effects appearing in each of the groups 32, 34, and 36. The variable which is recorded upon the length of material illustrated in Fig. 2 continuously decreases in magnitude thereby approximating half of a cosine wave. Therefore the subsequent data position aligned with indicia 40 has nine effects in the tenths group 32 and in the hundredths group 34, but only eight effects in the thousandths group 36, indicating a data value of .998. The thousandths value as indicated by the number of effects in the group 36 continues to decrease to the position indicated by the indicia 42, at which point only eight effects appear in the hundredths group 34, indicating a data value of .989. It can be seen that the data values continue to decrease as the data positions descend on the record material, and at the data position indicated by indicia 44 it can be seen that only eight effects appear in the tenths group 32, while nine appear in each of the groups 34 and 36, indicating a data value of .899.

Following the known variations in the value of the cosine from zero to 90°, the data values for subsequent positions continue to decrease until at the position indicated by the indicia 46, which represents the 90° position, no effects appear in any of the three groups 32, 34, and 36, and thus the cosine value is zero. The next data value, indicated by the indicia 48, is shifted to the right side of each of the digital groups to represent a change of sign to negative. Consequently the value of the data representing the cosine of 91° indicated by indicia 48 is −.017. As is clearly illustrated by visual inspection of the remainder of the record 50 of Fig. 2, the cosine values continue to increase negatively until at the position indicated by the indicia 52, nine effects appear in each of the digital groups, representing a data value of −.999. A fourth column of data 54 is provided in which a coded reference may be printed to indicate the exact nature of the material printed in the existing three columns. This might be the information of which the record is made, the place where made, various conditions under which the data was taken, such as temperature and the like, the person making the record, or any other information which might be desired in later interpreting the data contained on the record material.

The record 56 illustrated in Fig. 3 typifies one made during a flight wherein temperature has been recorded with a range of variations between ±100° C. The record 56 is generated beginning at the bottom of the record material, as illustrated in Fig. 3, and the data element positioned as indicated by the indicia 58 represents the ambient temperature at ground level of 29° C. before taking off.

From the above description and inspection of record 50 it is believed clear that the temperature as recorded is continually decreasing until at the position indicated by the indicia 60, the ambient temperature is 0° C. Continuing the aircraft's ascent, the temperature continues to decrease until at the time indicated by the indicia 62, the temperature has reached a minimum of −29°, at which time the aircraft has leveled off and the temperature remains substantially constant during level flight. Approximately at the time indicated by indicia or mark 64, the aircraft began its descent, and it is clear that the temperature began to rise until at the point indicated by the mark 66 the temperature is 0° C. As the aircraft lands, the ambient temperature on the ground is indicated by the record defined by the mark 68, which is seen to be +12° C. This information, in combination with a similar record of humidity and altitude, is of great value in meteorological study to determine dew point and icing conditions in flight and thus to study methods of increased flight safety.

Supplementary data is recorded on record 56 in the third channel 70 to particularly define the exact data contained in the two data channels. Contained in the reference channel 70 are four data elements 72, indicating the aircraft number, four data elements 74, indicating the flight number, an additional four elements 76, indicating the year 1953, two data positions 78, indicating the month, December, two data elements 80, indicating the day of the month, the 25th, two data elements 82, indicating the hour, 1300, and two data elements 84, indicating the minutes, 40. From this description it can be seen that on this relatively small section of record material, information is accurately recorded of a continually varying condition, namely, time, with other necessary reference information and samples of any variable, here temperature. Data samples may be taken at any desired rate along with supplementary reference information defining the conditions under which the test measurements were made. In this instance the reference information would be repeated along the length of the record material every ten minutes, and as can be seen from the record 56, sixty data samples are printed on the record between each reprinting of reference information, which means that a data sample has been recorded every ten seconds.

While the record last described represented temperature measurement during an aircraft flight, it is believed clear that any numerical data may be transformed into unitary decimal digital form and recorded in the manner above described with any desired reference information coded into an accompanying adjacent channel. Furthermore, it is believed manifest from this description that many advantages are inherent in this record which have not been heretofore available in any known recording system. A glance at the record illustrated in Fig. 3 will immediately indicate to a skilled observer the exact character of the temperature variations which the recording aircraft has experienced. From this information an observer may abstract a general trend by mere observation of the shape and character of the curves described by the intermittent lines or be read specific data at any desired point in the flight by merely locating the point as a function of time and counting the visible effects present adjacent to the nearest mark. The fifth effect in each group has been given a distinguishing appearance to facilitate quick visual interpretation. In the record here described the fifth effect of each group has a horizontal cross extending therethrough, but it is believed clear that various other means may be utilized for this purpose.

Having described the record, one apparatus for generating such a record will be disclosed in detail. However, it is believed manifest that this record may be printed either by the machine to be described or various other apparatus easily within the scope of one skilled in the art, or it may be generated by manual means, either by a manually-operated printer or typewriter, or by pencil or pen and ink manipulation.

As shown in Fig. 4, one convenient record generating apparatus is adapted for panel mounting in an aircraft along with other navigational equipment mounted in the standard equipment racks. The apparatus comprises three adjacent units: a control unit 86, a recorder unit 88, and a measuring unit 90. As here shown, the three units are interconnected by a common rotatable shaft 92, but each may, if desired, incorporate an independent motor for rotating the apparatus contained therein, in which event a control cable interconnects the various units to insure proper sequential operation. None of the operations of the three units are so interrelated that mechanical synchronization is required. It is desirable in apparatus of this type to have a visual display of the recently generated record, and for that purpose the record storage apparatus is positioned at the forward face of the recorder 88, and a portion of the record 92 is visible along said front face. The record is printed along the upper edge of the front face 94 by a plurality of printing arms which lie along the top surface of the recorder, as will be described below. Approximately 100 data samples then remain visible before being placed upon a take-up spool contained at the bottom of the recorder 88. The control unit 86 has a reset lever 96 which positions or resets a timing clock 98, said clock controlling all of the operations of the recorder. Also a plurality of slides 100 are longitudinally positionable along tracks 102 to manually set up the reference data, such as date, flight number, aircraft number, and the like, above described. A mechanically stepped wiper samples the position of the slides 100 by sweeping longitudinally and stepping vertically in a timed sequence. A protective cover 104 is pivotally mounted to enclose the clock 98, reset lever 96, and reference data slides 100.

To better understand the apparatus contained within each of the units 86, 88, and 90, reference should be made to the block diagram of Fig. 5. The control unit 86 contains apparatus for sequentially energizing both the measuring unit 90 and the recorder 88. A motor 106 may be mounted within the control unit 86, as shown, or may be mounted externally and connected to the shaft 92. The motor 106 drives a train of gears 108 contained within the control unit 86 and, mechanically connected to gears 110 in the measuring unit 90, gears 112 in the recorder 88. Each of these gear trains 108, 110, and 112 drives a one-turn clutch which is normally disengaged and adapted to be engaged only at predetermined times as determined by the clock 98 and associated timing mechanism contained in the control unit. The clock 98 is of a conventional type and drives a pulse generator 114 which generates one electric impulse each second. Each time an electric impulse is generated from the source 114, the clutch 116 is actuated and through gears 118 is connected to drive a second one-turn clutch 120, an interval selector 122, and a time reference advance 124. The interval selector 122 may be a simple cam or gear arrangement whereby the clutch 116 must receive any predetermined number of pulses before the interval selector will generate a pulse which will actuate the clutch 120. Thus while the clutch 116 makes one revolution in each second as a result of the pulse rate of generator 114, the interval selector 122 may cause the clutch 120 to be energized less frequently, for example, once every 10 seconds, which will in turn determine the frequency with which the reference contact scanner 126 and program control 128 are actuated. The reference data set indicated by block 130 contains the slides 100 and tracks 102, as above described with respect to Fig. 5, and is manually set to determine the data which is desired in the reference channel. The reference contact scanner 126 sequentially samples the positions of the slides 100 and transmits a signal corresponding to these positions through the electrical connection 132 to the storage counters 134 of the recorder 88. The frequency with which the reference data is recorded is therefore determined by the frequency of operation of the interval selector while the time reference 124 is stepped each second by the pulse generator 114. The timers and one-turn clutches described are used in preference to straight gearing, because it is desirable to present the intervals at which the apparatus functions. Customarily, of course, the particular portion of the apparatus actuated will function in a very short period of time at the beginning of such an interval, and then remain idle during the remaining operations. The program control 128 actuates a one-turn clutch 136 contained within the measuring unit 90. Clutch 136 is mechanically connected through appropriate gears 138 to a recording cycle control 140, which may be a cam or a commutator, a pulse generator 142, and a reference value generator 144. The reference value generator, electrically connected to null detector 146, energizes the null detector with a continuously varying voltage during a measuring cycle. The null detector also receives an electrical signal from a sensing element 148. The sensing element 148 will produce an electrical analogue of any measured quantity. For example, it may produce a varying voltage corresponding to varying temperature, such as the output of a thermocouple, or may present a varying resistance to the null detector, such as might be available when utilizing a high thermal coefficient resistor as a sensing element. The null detector 146 is, in this embodiment, a bridge balanced by the positioning of a continuously rotatable potentiometer. In addition the null detector generates a series of pulses wherein a reversal in phase effectively results in an indication of the magnitude of the variable sensed by the element 148. This will be explained in greater detail with respect to Fig. 6.

A series of pulses normally passes through a control gate 150 to storage counters 134, but upon the null detector 146 experiencing a phase inversion, the gate 150 blocks subsequent pulses. The number of pulses which represents the magnitude of the sensed data is inserted in the storage counters 134, which are adapted to store the data in the unitary decimal digital form. That is, in recording a three-digit variable, three storage counters are utilized connected in series relationship, the first of which contains an effect corresponding to the hundreds digit, the second counter contains an effect corresponding to the tens digit, and the third counter contains an effect corresponding to the units digit. At a predetermined time after the completion of one measuring cycle, the recording cycle control 140 generates an electrical pulse which is transmitted to the recorder 88 for energizing an electrically controlled one-turn clutch 152. The clutch 152 operates the recorder 88 through gears 154, as will be explained in greater detail with respect to Figs. 9 and 11. Printing heads 156, a readout pulse generator 158, and a ribbon and paper drive 160 are all mechanically driven from the output of the gear train 154. The pulse generator 158 generates a series of ten pulses which are fed into the storage counters 134, which are previously switched into parallel relation, and upon feeding into the storage counters the conjugate of the numbers initially stored as received from the measuring unit, electrical switch gates 162 will be actuated, which will cause the interference bars in printing heads 156 to shift, thus impressing upon the record paper 164 an inked record consisting of unitary decimal digital effects through the ribbon 166, as will be described in greater detail. This record is then available for immediate observation by aircraft engineering personnel. Upon reaching a central interpreting station, the record may be utilized in various ways including re-recording into other customary data forms.

One particular measuring unit, illustrated in Fig. 6, is adapted to utilize a variable resistance corresponding to the sensing element 148 described with respect to Fig. 5. The measuring unit of Fig. 6 is used to generate a series of pulses at its output, the number of pulses in the series indicating the magnitude of the data measured. The sensing element 148 is connected in series with a resistor 168 to form the unknown arm of a bridge which constitutes null detector 146 of Fig. 5. The balancing arm of the bridge 146 comprises a fixed resistor 172 and a continuously variable resistance or reference value generator 144 which is mounted on a shaft 176 and adapted for continuous rotation. The variable resistance 144 comprises a resistance element 182 having a generally circular configuration connected between a pair of slip rings 178 and 180. A wiper 184 is adapted to engage the resistance element 182, and the portion of the resistance element 182 disposed between slip ring 178 and the point of contact of the wiper 184 will be inserted in series with the fixed resistor 172 through the flexible conductor 186 which supports the wiper 184 and the brush 188 which is in sliding engagement with the slip ring 178. The ratio arms of the bridge 146 comprise two fixed resistors 190 and 192. Connected in parallel with the sensing element 148 and rotating resistor 144 is a balancing network comprising fixed resistors 193 and 194 and potentiometer 196. The wiper 198 of the potentiometer 196 is connected to the common terminal of the sensing element 148 and the rotatable balancing resistor 144. By positioning the wiper 198 at the desired point along the potentiometer 196, an initial balance is established in the bridge for any desired condition of the sensing element 148 or position of the rotatable resistor 144. An A.C. source for operation of the bridge comprises a commutator 200 which is mounted on shaft 176 and rotates in synchronism with the rotating potentiometer 144. The commutator 200 has a face 202 having any desired number of segments thereon as determined by the total number of increments into which the data sample is to be divided.

In a system using three decimal digits in which it is desired to record both positive and negative values, as will be described hereinafter, the commutator face 202 will have 2000 conducting segments thereon. All of the conducting segments are electrically connected to a slip ring 204 which is engaged by a sliding brush 206 connected through conductor 208 to a source of D.C. voltage such as a common grounded B+ supply indicated by the arrow 210. A second brush 212 engages the plurality of segments on the commutator face so that one rotation of the commutator will produce 2000 pulses of D.C. voltage at the brush 212. The output from the brush 212 is applied through conductor 214 to the grounded primary of the transformer 216.

The transformer 216 serves to isolate the bridge circuit from the B+ supply, to produce any desired voltage magnitude, and to reshape the wave form of the pulsed signal as desired. The secondary of the transformer 216 is connected across the bridge circuit 146 at the opposite terminals of the ratio arms, as is well understood in the measurements art, and the output from the bridge circuit is taken between the common terminal of the ratio arms 190 and 192 and the common terminal of the sensing element 148 and rotatable balancing resistor 144.

This A.C. output energizes a grounded transformer 218 having its secondary connected to the control grid of an amplifier tube 220. The amplifier tube 220 is a part of an amplifying circuit 236 having a resistor 222 connected between its cathode and ground, a resistor 224 connected between its grid and ground, and a plate resistor 226 connected between the plate of tube 220 and the source of D.C. voltage 210. Resistors 228 and 230 and condensers 232 and 234 are provided to form an additional filtering and isolating circuit for the plate supplies of the amplifying tubes, as is believed well understood. The signal from the amplifying stage 236 is applied from the plate of tube 220 through the condenser 240 and through a grid resistor 242 to the control grid of tube 244 in the second amplifier 238. Tube 244 is also connected in a conventional amplifying circuit having a grid resistor 246, cathode resistor 248, and plate resistor 250. The output of the second amplifier stage 238 is applied to the grid of gas filled tube 254 in pulse train control gate 150 from the plate of tube 244, through condenser 252 and series grid resistor 256. The grid of tube 254 is connected to ground through resistor 258. The plate of gas tube 254 is connected to the secondary of a transformer 260, the primary of which has one terminal connected to ground and the other energized through conductor 262 from the brush 212 on the commutator 200. Thus a pulsed voltage is applied to the plate circuit of control gate 150 at a rate identical to that applied to the null-detecting bridge 146. The other terminal of the secondary of transformer 260 is connected to the input of the storage-counting circuit 134 in the recorder 88, which will be explained in greater detail when describing Figs. 9 and 11.

If the potentiometer is rotated as indicated by arrow 174, the control gate operates as follows. A pulsed voltage is applied to the plate circuit of the gate, and a similar pulsed voltage is applied to the control grid of the gate, and at all times prior to the instant of bridge balance the control grid voltage is in phase with the plate voltage of the gate, and thus the tube 254 will conduct on each positive half cycle of voltage applied through transformer 260. At the instant of bridge balance the output voltage applied to transformer 218 goes through a null or zero value, and for continued rotation of the shaft 176 the magnitude of the output voltage from the bridge will increase but the phase of the output voltage will be shifted by 180°. Thus at the instant of bridge balance and consequent phase reversal, the control gate 150 will cease conducting, as the grid and plate will be energized with out of phase signals. Thus the pulsed voltage will be applied to the storage counters 134 only during the conduction period prior to balance. The number of pulses fed into the storage counters 134 is proportional to the percentage of one complete rotation completed by the shaft 176 before bridge balance occurs. This percentage of rotation represents a definite resistance magnitude as determined by a comparison with the continuously varying arm, and is therefore a direct measure of the unknown, in this instance temperature. By proper calibration of the bridge circuit 146, each pulse may be made to represent an incremental temperature change, such as $\frac{1}{10}$ of 1°. The number of pulses stored in the storage counters 134 is therefore a direct measure of the indicated temperature, and the temperature can readily be arrived at, in degrees, by dividing the number of pulses stored in the counter by ten. A calibrating circuit 264 is provided having a D.C. supply 266 and a potentiometer 268 connected in parallel therewith having one side grounded and the wiper 270 of the potentiometer connected to a shield grid in the gas tube 254 of the control gate 150. This circuit provides control of the firing point of tube 254, whereby the tube may be biased to conduct precisely for all values of control voltage greater than a predetermined value and to sharply cut off at said value.

It is believed clear that while one particular source of pulsed data has been described, this is merely exemplary of one mode of operation, and it may be equally desirable to place pulsed data in the storage counters 134 by either automatic sensing means or by manual key punch operation or the like. Furthermore, while the sensing element here described is a high thermal coefficient resistor, the circuit would function equally well if the sensing element were a variable voltage element responsive to temperature change or any other variable to be measured.

Referring now to Fig. 9, the measuring unit 90 which has just been described in detail is shown connected to the storage counters 134, which are here indicated in block form to convey a general understanding of the mode of operation. The pulsed data from the measuring unit 90 is applied through a diode 300 to a trigger circuit 302. Diodes similar to the diode 300 will be found at various points throughout the circuits to be described, and generally serve the purpose of allowing unilateral pulses in a given direction while preventing feedback into the outputs of the various circuits. The trigger circuit 302 is merely a conventional gas tube circuit adapted to receive the somewhat weak and poorly shaped pulses from the measuring unit 90 and to provide sharp, crisp, large magnitude output pulses. The output from trigger 302 is fed to a decimal counter 304 which may be any one of a plurality of well-known ring counters adapted to generate an output pulse for every ten applied pulses. One such counter is described in some detail in an article entitled "Neon Diode Ring Counter," appearing in the January 1950 issue of Electronics. This circuit will not be explained in detail here, as it is well understood by those skilled in the art. An output pulse is generated by the units counter 304 for each ten input pulses received from the trigger 302. The units counter is connected through conductor 306 to the moving element of a transfer switch 308 which is normally in engagement with contact 310 connected through conductor 312 to the input of a tens trigger 314. All of the triggers hereinafter referred to are constructed to function in a manner identical to that described above with respect to trigger 302, and thus for each pulse applied to the trigger 314, a sharp, large magnitude pulse will be applied to the tens counter 316. For each ten pulses applied to the tens counter, which is also a decimal counter similar to counter 304, one output pulse will be generated. It will follow from this that for every 100 pulses generated by the measuring unit 90, a single pulse will be available at the output of the tens counter 316. This pulse is applied through conductor 318 to a transfer switch 320 normally in engagement with a contact 322 which is connected through conductor 324 to a hundreds trigger 326. The output of the trigger 326 is applied to a hundreds counter 328 which is also a decimal counter and generates one output pulse for each ten incoming pulses. It is believed clear that an output pulse would be generated by the hundreds counter for every thousand pulses generated by the measuring unit 90 and applied to the units counter 304. Upon receipt of the thousandth pulse from measuring unit 90, the output pulse generated by the hundreds counter is applied to the bistable multivibrator 330 through the transfer switch 332 which is normally in engagement with contact 334.

As was above described, this particular apparatus is adapted to record temperatures in tenths of degrees between −100 and +100° C. when energized from the measuring circuit of Fig. 5 which generates a total of 2000 pulses. Thus upon receipt of 1000 pulses, a zero temperature value has been indicated, and it is desired that the apparatus begin sensing and subsequently printing positive values. Thus the bistable multivibrator which has two conducting channels, only one of which may be operative at any given time, is energized so that the knowledge that positive numbers are now being recorded is stored therein.

During the initial portion of an input cycle, the multivibrator 330 is so operating that a printing pulse gate 342 is biased to pass a printing pulse while an extra pulse gate 336 is biased to prevent the passage of an extra pulse therethrough. These gates are simple gas tube circuits, one of which will be described in detail with respect to Fig. 11. Upon receipt of the 1000th pulse, the multivibrator shifts to bias the printing pulse gate 342 to prevent conduction and the extra pulse gate 336 to permit conduction. Assuming that a positive temperature value has been indicated by the measuring unit, pulses will therefore continue to be applied to the counting circuits and the counters will again begin to function as above described with no preserved indication that 1000 pulses have already been sensed other than that information stored in the bistable multivibrator 330.

As the transition between negative and positive numbers occurs, there will be a value recorded by the counters which may be defined as a negative zero. That is, when the 999th pulse has been fed to the apparatus, each of the three counters has nine counts stored therein, and, as will be explained subsequently, in printing this will produce a −0 print. Upon the receipt of one additional pulse from the measuring unit 90, all of the counters will be cleared, as this is the thousandth pulse, and if at this instant a record were printed, the record would indicate a +0. This would constitute an obvious ambiguity. To overcome this error the gate 336 is provided which is actuated by the output of the bistable multivibrator 330 so that an extra pulse will be passed from a commutator 337 through the gate 336 and applied through conductor 338 and diode 340 to the units trigger 302 upon the commencement of a printing cycle. This extra pulse will appear to the apparatus as an additional pulse generated by the measuring unit 90 for all positive data values and will thus serve to eliminate the positive zero and thus the double zero error.

When the thousandth pulse energizes the multivibrator 330, the printing pulse gate 342 is biased to prevent passage of a pulse which is generated from the commutator associated with the one-turn clutch 152. This pulse normally actuates an interference bar in each of the three printing heads: the units head 352, the tens head 354, and the hundreds head 356. The operation of these interference bars will be explained in greater detail with respect to the other figures, but generally the interference bar is normally positioned so that during a printing cycle no effects will be impressed upon the record medium. Upon receipt of a printing pulse from the gate 342, the interference bar is shifted to a first actuated position which will allow the printing mechanism to produce effects during the recording cycle. Upon receipt of a second pulse, the interference bar will shift to a second actuated position where it will again prevent the printing head from making any impressions upon the record material. Thus when a thousand pulses are received from the measuring unit 90, the multivibrator 330 is pulsed which biases the printing pulse gate 342 which will pass a first pulse to the output controls 344, 346, and 348 to shift the interference bars to the first actuated or printing position for negative numbers and will not pass a pulse for positive values.

Upon completion of the measuring cycle, an impulse is transmitted from recording cycle control 140 of the measuring unit 90 through conductor 350 to actuate the one-turn printing clutch 152. The printing clutch drive is driven from the motor 106, as described with respect to Fig. 5, and through appropriate gears drives a readout pulse generator 158, rotatable cams on the recording heads 352, 354, and 356, which in turn sequentially actuate associated printing arms, and drives a cam 380 and associated switch device which automatically shifts the counters from their previous series arrangement with the transfer switches 308, 320, and 332 in their normal positions to a parallel arrangement whereby the transfer switches 308, 320, and 332 are shifted to feed the output pulse from the units, tens, and hundreds counters 304, 316, and 328, respectively, to the units, tens, and hundreds controls 344, 346, and 348. The readout pulse generator 158 is a commutator having conducting segments which is connected to a source of voltage whereby during one revolution of the clutch 152, and consequently one printing cycle of the heads 352, 354, and 356, ten voltage pulses will be transmitted from the pulse generator 158 to each of the triggers 302, 314, and 326. Diodes 358, 360, and 362 are provided in the conductors connecting pulse generator 158 to the three counters whereby pulses will be passed from generator 158 to the counters, but pulses will not be fed in the inverse direction. The readout pulse generator is also connected through conductor 364 to the grid of the normally conducting tube in the bistable multivibrator 330. Thereby upon initiation of the printing cycle, a pulse from the generator 158 resets the bistable multivibrator to its normal state. As the timed pulses from the generator 158 are fed to the three counters, now in parallel, pulses from this source will add to those already present in the counters as applied from the measuring unit 90. When the sum of pulses from the measuring unit in a particular digits counter plus the number of pulses from the readout pulse generator is equal to ten, that particular counter has gone through a complete cycle and will generate an output or control pulse. In the meantime, if the number is a negative one, the corresponding printing head has been making impressions upon the record 366, one impression for each pulse of generator 158. For example, if the value to be recorded were −99.2°, the measuring unit will generate seven pulses. These seven pulses will be contained in the units counter, and as this is a negative number, the printing pulse gate 342 is biased to pass the pulse from commutator 337, and upon initiation of a printing cycle a pulse is transmitted through conductor 368, the gate 342, conductor 367, conductor 369, and diode 371 to the output control 344, whereby the interference bar in head 352 is shifted and impressions are made from the beginning of the printing cycle. For each impression that is made on the record medium 366, a pulse is generated by the generator 158 which is fed to the counters 304, 316, and 328. Upon the horizontal identifying effect and two impressions being made on the record 366 by the units head 352, and consequently three pulses transmitted from the generator 158 to the units counter 304, the units counter reads out, passing a control pulse through the conductor 306, the actuated transfer switch 308, and conductor 370 to energize the output control 344 and move it to the second actuated or nonprinting position.

In the tens and hundreds counters no pulses have been set up from the measuring unit, as only seven pulses were received therefrom. Therefore, upon initiating a printing cycle, the heads 354 and 356 will immediately commence printing and the readout pulse generator 158 will feed timed pulses to the tens counter 316 and the hundreds counter 328. These counters will read out only after the tenth pulse is fed into the counters from generator 158 which will allow the horizontal identifying indicia and nine data effects to be printed. Therefore, both the tens control 346 and hundreds control 348 will be actuated at just prior to the end of the printing cycle before the second horizontal effect is printed so that one horizontal effect and nine data effects will appear on the record 366 in each of these digital groups. As described with respect to Figs. 2 and 3, the position of a horizontal effect upon the record medium in a given row indicates whether the number is positive or negative, and as in this instance the horizontal effect is printed initially it will appear on the far right edge of the group and thus indicate a negative number.

If the number fed into the apparatus from the measuring unit 90 is a positive number, the number of pulses generated would be greater than a thousand. As described above, the thousandth pulse will flip the multivibrator 330 to bias printing pulse gate 342 to prevent conduction and extra pulse gate 336 to allow conduction. Again, upon completion of the measuring cycle, a pulse is transmitted from the recording cycle control 140 of the measuring unit 90 through conductor 350 to actuate the one-turn printing clutch 152. The clutch 152 will then drive the connected apparatus through a printing cycle, causing the pulse generator 158 to transmit time pulses to the three counters in synchronism with rotation of the cam in the three printing heads 352, 354, and 356. However, in this instance the printing pulse gate 342 will not pass the pulse from commutator 337, and therefore the interference bars of the three printing heads remain in the unactuated or nonprinting position. Thus as the readout pulse generator 158 feeds pulses to the three counters, no effects are printed on the record 366 until the sum of pulses from the measuring unit and pulse generator which exist in any given counter is equal to ten. If the number to be recorded, as indicated by the measuring unit, were +.8° C., a total of 1007 pulses would be generated by the measuring unit 90. As described above, this number of pulses would drive the three serially connected counters through a complete cycle which would actuate the multivibrator 330, and an additional seven pulses would be stored in the units counter 304. An additional pulse would be added by commutator 337 through gate 336 at the beginning of the printing cycle to remove the zero ambiguity. Upon readout, no impression will be made upon the record 366 until two pulses have been generated and fed to the units counter 304, at which time this counter will have received eight data pulses and two readout pulses to generate a control pulse to actuate the units control 344 and shift the units interference bar in the head 352 to the printing position. The remainder of the printing cycle will cause the head 352 to make a total of eight impressions in the units group. In the tens and hundreds counter no pulses have been set up from the measuring unit 90, and therefore ten pulses will be required from the pulse generator 158, at which time these counters will read out, shifting the corresponding interference bars in the tens and hundreds printing heads 354 and 356 to the print position. This will allow each of these heads to print the horizontal effect above described, indicating zero value for each of these digital positions.

Upon completion of a printing cycle, the cam 372 which is driven from the gear box 374 will engage switch contact 376 to open the ground connection to each of the counters 304, 316, and 328, thus resetting the entire apparatus for receipt of subsequent information. Also mounted on the shaft 378 for rotation with the cam 372 is the cam 380 which operates the three transfer switches 308, 320, and 332. Cam 380 is so shaped that shortly after initiation of a printing cycle by the one-turn clutch 152, the switch operating card 382 is raised to operate the transfer switches and shift the counters from series connection to parallel, as above described. Upon completion of a printing cycle, the card 382 returns to its normal position and the counters are once again placed seriatim to receive another group of unitary pulses from measuring unit 90.

One printing head which may be utilized with the circuit just described is shown in Figs. 7 and 8. The head consists of a frame 400 having two face plates 402 mounted in spaced relationship on a plurality of metal rods 404. One of the face plates 402 has been removed in Fig. 7 to show the internal structure of the printing head. The head generally consists of a plurality of hammers or printing arms 406 which are pivotally mounted on pin 405 and biased to a nonprinting position by integral flat springs 407 which engage pin 409. The printing arms 406 are engageable by a continuously rotatable cam assembly 408 which has a plurality of cam teeth 410 disposed about its periphery in a generally helical fashion whereby the printing arms 406 are sequentially engaged and moved toward a printing position. An interference bar 412 is pivotally mounted about pin 413 in the frame 400 for movement from a first non-printing position to a first actuated or printing position, and further movement to a second actuated or nonprinting position. The interference bar 412 is urged to an extreme counterclockwise position by a wire spring 418. A solenoid 414, mounted in the frame 400, has an armature 416 pivotally mounted on pin 430 in spaced relationship to the solenoid, said armature having a lever arm 428 extending therefrom adapted to actuate a pair of control dogs 420 and 422 which determine the position of interference bar 412. The various catches on the dogs 420 and 422 prevent counterclockwise motion of the interference bar under the influence of spring 418. Initially, the interference bar is engaged by the catch 424 extending downwardly from the first dog 420 which is spring-biased to normally engage the surface 426. Upon energization of the solenoid 414 the armature 416 is drawn to the position shown, causing the lever 428 to pivot around the axis 430 and lift dog 420 out of engagement with the interference bar 412 and at the same instant lower dog 422, which is normally spring-biased in a clockwise direction. The interference bar 412 then moves to the left in Fig. 7 under the influence of spring 418 to engage the hooked portion 454 of dog 422. The coil 414 has been energized with a pulsed voltage as above described, and therefore the armature 416 quickly returns to the normal position (not shown) which allows lever 428 to drop to its normal position allowing dog 422 to rise out of engagement with interference bar 412 and dog 420 to drop to the normal position in which catch 434 engages the interference bar and maintains it in a position disposed within the gap 436 in the printing arms 406. While the interference bar is so positioned, the printing arms 406 under the influence of cams 410 will move to the fully extended printing position and cause an effect to be produced on the record medium 438 through an inked ribbon 440. The printing arm 406a is shown in nonprinting position, while the printing arm 406b has just reached the printing position as a result of the action of cam face 410a. A plurality of vertical guides 439 insure uniform positioning of the arms 406 and consequently uniformly positioned effects. It is found that by providing discs 472 having a diameter greater than the diameter of the cam members and positioning one of said discs between adjacent cam members, the printing arms 406 are maintained in perfect alignment with the associated cam member. The medium 438 is spirally wound into a roll 442 on a mandrel 444 and is contained within a cartridge which will be described in considering Fig. 12. Paper is withdrawn from the roll 442 and passed over an idling roller 446 and a typing platen 448 preferably having a firm rubber peripheral coating 450 thereon.

Upon application of a second pulse to the coil 414 the armature 416 is again drawn up, lifting the lever 428 and causing the dog 420 to be lifted, thus allowing the interference bar 412 to move to its extreme counterclockwise position, as shown in dotted lines, where the normal printing motion of arms 406 will be prevented by engagement with the surface 452 of said arms. At the end of a printing cycle a reset mechanism 453 is provided to move the interference bar 412 in a clockwise direction to the unactuated nonprinting position behind catch 424 in preparation for a subsequent printing cycle. The forward edges of catches 424, 434, and 454 have smooth cam surfaces so that the interference bar 412 may readily force them upwardly, allowing them to fall under the tension of the springs provided to engage the interference bar after the reset operation. The reset mechanism 453 comprises a lever 456 pivotally mounted on a pin 458 and urged by wire spring 460 into engagement with the surface of rotating cam 408. Upon a preselected cam tooth 410b engaging the lever 456, the lever is forced in a counterclockwise direction, producing translatory motion in a pivotal connecting link 462, which produces a similar counterclockwise motion in the reset lever 464 which is pivotally mounted on pin 466 and engages a lower extending portion of the interference bar 412, forcing the interference bar to the reset position as indicated by the dotted line positions of the reset linkage.

While the heads are here described as adapted to produce printed effects upon a paper record, it is believed clear that the arms 406 may be used to perforate a tape to produce a similar unitary digital record. Other similar techniques might also be employed, such as the use of electrically sensitive paper or pressure sensitive paper to record the motion of the arms.

As shown in Fig. 8, three printing heads adapted to print three decimal digital positions are shown. Each of the printing heads has eleven printing arms 406 mounted in parallel spaced relationship, and the printing arms of the various heads are mounted in substantially parallel alignment. Here the three heads are shown mounted in a single housing 468, and it should be clear that each unit may be complete in itself, having a housing such as the housing 400 shown in Fig. 7 with the three heads secured together by external means. By the use of this type mounting, any number of heads may be mounted in side-by-side relationship, and the number of heads will depend upon the data to be recorded under a given condition. The printing arms associated with the units printer 470 of Fig. 8 have been removed to clearly show the operating apparatus thereof. The helical positioning of the teeth 410 on cam 408 can clearly be seen in the units printer 470.

An alternate head construction 480 is shown in Fig. 10 which has a simplified mechanical structure and utilizes three electromagnetic coils 474, 476, and 478. This head operates in generally the same manner as the head above described and has a plurality of tooth-like cams disposed about a continuously rotatable shaft to form a generally helical pattern. These cams sequentially engage a plurality of printing arms 482, moving them toward to printing position where they would normally engage an inked ribbon 484 to form a permanent record on a strip of paper 486. When utilizing the decimal system of recording as here described, eleven printing arms 482 are utilized, nine of which make a substantially vertical impression upon the paper strip 486, while the arm on either end of the group is formed to make a generally horizontal mark which is utilized to make a plus or minus zero effect, depending upon its position with respect to the remainder of effects. A guide 488 is provided with eleven substantially parallel elongated slots therein, each of said slots receiving one of the printing arms 482 to guide said arms in a generally vertical path. A wire spring 490 is secured to each of the arms 482 and engaged under a pin 492 which is secured in the housing 494. In this embodiment an interference bar 496 is provided which is movable between two positions. The interference bar 496 is pivotally connected to a centrally mounted armature 498 and adapted for sliding engagement in a groove 500 formed in a block 501, which is a part of the housing 494. The coil 474 is positioned above the pivot 502 of the armature 498, and when the coil 474 is energized the interference bar 496 is moved to the right in Fig. 10, which is the noninterfering or printing position. The coil 476 is a small magnetic biasing coil which is continuously energized while the apparatus is in operation. The coil 478 is mounted to attract the armature 498 below the pivot 502 and thus will cause motion of the interference bar 496 to the left in Fig. 10, which is the interfering or nonprinting position. When either the coil 474 or 478 has been energized, the biasing flux generated by the coil 476 and traversing the path consisting of core 504, one half of armature 498, either core 506 or 508 associated with coil 474 and 478, respectively, and half of mounting base 508, all of which are made of high permeability magnetic materials, will maintain the armature in engagement with the pole piece of the appropriate core.

To make a printed record with the printing head of Fig. 10, the apparatus will initially be in the noninterfering position. That is, at the beginning of each recording cycle the coil 474 is pulsed with energy to attract the armature 498. If a pulse is received from the gate indicating a negative number is to be recorded, this pulse will be applied to the coil 474, thus attracting the armature 498 and moving the interference bar 496 to a printing position. The cam 408 during rotation will cause the various printing arms 482 to sequentially make an impression on the paper 486 until the counting mechanism reads out a predetermined number, at which time a pulse is applied to coil 478, moving the interference bar 496 to the interfering position and thus preventing further printing.

If, on the other hand, a positive number is to be recorded, the printing cycle will begin with the armature 498 in engagement with the pole piece of core 510, and thus no printed record will be made until a control pulse is received and applied to the coil 474, at which time the interference bar 496 is shifted and the printing arms 482 make a record for the remainder of the cycle. At the end of the cycle a reset pulse is automatically fed to coil 478 to reset the apparatus by moving the interference bar 476 into the interfering position.

The head of Fig. 10 will require a circuit somewhat different from that described in Fig. 9, as the three-position interference bar utilized with that particular circuit has here been replaced by a two-position interference bar and two actuating coils. The circuit of Fig. 11 operates in much the same manner as that of Fig. 9, substituting electrical switches for some of the mechanical operations performed in the prior structure and utilizing a switching arrangement which automatically energizes the appropriate coil in the head 480, depending upon whether a positive or negative number is being recorded.

In Fig. 11 the measuring unit 90 is shown connected to the circuitry and is adapted to provide a series of pulses, the number of pulses representing the magnitude of the data to be recorded. The pulses are first applied to the three decimal counters 512, 514, and 516 which are connected in series in much the same manner as described, whereby the counter 512 contains a response corresponding to the units digit, the counter 514 has registered the tens digit, and the counter 516 registered the hundreds digit. The counters 512, 514, and 516 are placed in series relationship through an electronic switch 518 which serves a function identical with that of transfer switches 308, 320, and 332 of Fig. 9. Upon completion of a measuring cycle a pulse is transmitted from the measuring unit 90 through conductor 520 and delay 522 to energize a gate 524 which controls a one-turn clutch (not shown) through coil 526. The gate 524 is a simple gas triode control having a negative bias applied to its grid through resistor 528 and its plate connected through resistor 530 to a source of D.C. voltage. The cathode of this gate is connected to ground. In all of the circuits to be described, terminals labeled "A" represent a ground connection, "B" represents a positive high voltage supply connection, and "C" represents a positive bias connection. A relatively large condenser 532 is connected between the plate of tube 534 and ground and will normally be charged to the B+ voltage when the tube is nonconducting. The condenser 532 is adapted to maintain conduction in the gas tube 534 for a short period of time after receiving the record pulse from the measuring unit. The resistor 530 is so chosen that the current flowing in the gas tube 534 under quiescent conditions is not sufficient to maintain ionization, so that during the discharge time of condenser 532 the gas tube will remain ionized and the coil 526 be energized, but the tube will then deionize and the coil will be de-energized. This provides a sufficient period of time, however, to actuate the one-turn clutch associated with the printing apparatus and thus eliminates the need for any manual or mechanical resets to open the gate circuits.

The record pulse from the measuring unit 90 after passing through time delay 522 is also applied through conductor 536 to the grid of a gas tube 538 in the electronic switch 518. This will cause the gas tube 538 to conduct and extinguish tube 540, whereby the counters 512, 514, and 516 are switched from series to parallel relationship. The function of the electronic switch 518 is generally to bias one of two possible pulse paths so that the pulse will follow only the other remaining path. The switch functions as follows, describing only the units pulse path in detail. The output of the counter 512 was initially applied through conductor 542, diode 544, and conductor 546, to the input of the tens counter 514 with tube 538 nonconducting and tube 540 in conduction. Upon firing of gas tube 538 the steady-state voltage present at point 548, as determined by the cathode voltage of the gas tube, rises above the level of the pulses received from the units counter 512, and thus the pulses are no longer applied to the tens counter 514. At the same time the pulses are fed through conductor 542, conductor 550, diode 552, and conductor 554 to a second electronic switch 556. The latter path comprises parallel channels for the three counters to be used during readout of the data. The diodes 544 and 552 are required to maintain the two possible pulse paths at different potentials. Electronic switch 556 distinguishes between positive and negative numbers and applies the signal received through alternate paths, depending upon the character of the number to be recorded. If the number to be recorded is a positive number, the gas tube 558 of the negative number switch 556 will be conducting and the alternate tube 560 will be quiescent during the printing cycle. Thus the pulse received from conductor 554 will pass through diode 562 and be applied to gate 564 through conductor 566. Upon receipt of the pulse at the gate 564, the coil 474 contained in the units head is energized with a pulse, which causes the interference bar as described with respect to Fig. 10 to move to the noninterfering position and thus commence printing. The gas tube 558 in the negative numbers switch 556 is conducting for positive numbers because of a firing pulse received through conductor 568, which is the output pulse from the hundreds counter 516 transmitted through conductor 570, conductor 572, diode 574, and conductor 568, thus biasing diode 578 to prevent transmission of the control pulse. If a number of pulses less than a thousand is generated by the measuring unit 90, indicating a negative number, the gas tube 558 in the negative numbers switch 556 would be quiescent while the gas tube 560 would be conducting, and in that event during the printing cycle the readout pulse of the units counter 512 would be transmitted to the units printing head through conductor 542, conductor 550, diode 552, conductor 554, conductor 576, diode 578, and conductor 580. This signal is applied to a gate 582, which is a gas-filled triode and controls the current to the coil 478 which actuates the interference bar to the nonprinting position.

When recording positive numbers as above described, the interference bar is initially in the interfering position, and upon receipt of the readout pulse through the path last described the coil 474 in the head 480 is energized, shifting the interference bar and allowing the printing arms to move to the printing position for the remainder of the cycle. On the other hand, when a negative number is being recorded, the interference bar is initially shifted to the print position, and upon receipt of the readout or control pulse through the alternate path just described, the coil 478 in head 480 is energized, shifting the interference bar to a nonprint position for the remainder of the printing cycle.

In addition to the units, tens, and hundreds heads described previously, the circuit here illustrated includes a reference data head 584 which is adapted to print the reference data referred to in the description of Fig. 3. Each of the heads 480, 584, 586, and 588 contains the two coils for shifting between printing and nonprinting positions and is energized from a pair of gates, and it is believed that the detailed description of the operation of the units head will be adequate to explain the operation of each of these heads and their associated gates. The units gates 582 and 564 have a D.C. voltage applied to the plate of a gas tube 590 through a plate resistor 592 which is sufficiently small that conduction will be maintained in the gas tube 590, once the actuating pulse has been applied to the grid of the tube through the circuit described. The grids of the gas tubes 590 will normally be biased positively from a source "C" connected to the grid resistors 594. The cathode of each gas tube 590 is connected to a coil in one of the printing heads, and all of the upper coils for shifting the interference bars to the print position, corresponding to the coil 474 in the units head 480, have a common connection through conductor 596, which is connected to a segment 598 on a commutator 600. The commutator wiper 602 is adapted to rotate through one complete revolution each time the one-turn clutch is energized from gate 524. This will occur once for each printing cycle. Conductor 604 extends from the segment 598 to one contact 606 of a transfer switch. The other fixed contact 608 of the transfer switch 610 is connected to an adjacent segment 612 of the commutator 600, which is also connected directly to a common conductor 614 which interconnects the coil in each of the printing heads 584, 588, 586, and 474 corresponding to the lower or nonprint coil 478 of the latter head. The movable contact of the transfer switch 610 is actuated by a coil 616 which is energized from a gate 618. The gate 618 includes a three-element gas tube having its plate connected through appropriate resistor 620 to a source of D.C. voltage B and its cathode connected through the coil 616 to an arcuate segment 622 on the commutator 600. A complete circular segment 624 on the commutator is positioned in spaced relationship to the arcuate segment 622 and connected to ground A. This segment 624 will be interconnected electrically with segment 622 through approximately 330° of the commutator's travel by wiper 602. This will correspond to the complete printing cycle period, and during the short gap in the arcuate segment continuity the cathode circuit of the gate 618 is broken, whereby the gate is reset to the quiescent state. At the same instant the ground connections 615 of all of the counters 512, 514, 516, and 662 are also broken, whereby they are reset for subsequent operations.

A plurality of small segments 626 are disposed about the commutator's face 600 and are electrically interconnected and in turn connected to the movable contact on the transfer switch 610. If the number to be recorded is negative, the gate 618 will be actuated, thus sending a print pulse to the print gates such as gate 564 through conductor 565, and also energizing coil 616 and drawing the movable contact of transfer switch 610 into engagement with fixed contact 608. This will place all of the contact segments 626 in circuit with the contact 612 and also in common with the circular segment 624 which is grounded, so that all of the lower or nonprint coils corresponding to the coil 478 of head 480 will be intermittently connected to ground. Therefore, when the readout pulse from any given counter is received, it will be passed through the left-hand side of the negative numbers switch 556 and applied to the appropriate gate corresponding to the lower or nonprint gate 582 of the units head. This will energize the lower coil and shift the interference bar to nonprint position to terminate the creation of impressions on the record paper. The wiper 602 will, during the next short period of time, move to one of the insulated segments disposed between each of the conducting segments, which will break the cathode circuit of the nonprint coil and will thus place the associated gate in the quiescent state. However, because of the biasing coil 476 described in Fig. 10, the interference bar will remain in the interfering position for the remainder of the printing cycle. If a positive number is to be recorded, the gate 618 will remain quiescent upon receipt of a recording pulse because of the removal of positive bias from the gas tube 646, and consequently coil 616 will not be energized, and movable contact on transfer switch 610 will remain in engagement with the fixed contact 606. Thus the segments 626 will be electrically connected through conductor 604 to segment 598, which is in turn connected to all of the upper or print coils correspondnig to the coil 474 of head 480 through conductor 596. The upper coils will be energized from the upper or print gates corresponding to the gate 564 of the units head, and these gates will conduct upon receipt of a readout pulse from the associated counter through electronic switch 518 and the right-hand half of the negative numbers switch 556. This particular arrangement of gates and commutator is found useful in avoiding erratic operation resulting from magnetic pickup or the like, as only the coils which are to be energized are connected in circuit, and when energized, only remain conducting for a very short period of time.

In this circuit, as in the circuit of Fig. 9, it is necessary in the transition from negative to positive numbers to insert an extra pulse to eliminate an ambiguity otherwise resulting from the existence of both a positive and a negative zero. This pulse is generated from the record pulse which is normally received through conductors 520 and 628 and will be applied to the units counter 512 through conductor 632 and diode 634 from an extra gate 630. Upon the thousandth pulse being transmitted by the measuring unit 90, the hundreds counter 516 reads out and passes a pulse through conductors 570 and 572, diode 574, and conductor 568 to cause the left-hand gas tube 558 of the negative numbers switch 556 to conduct. This causes the voltage at point 636 to rise as determined by the current flowing in resistor 638, thus biasing the grid of the gas tube 640 in the extra pulse gate 630 positively a predetermined amount so that receipt of the recording pulse through conductor 628 will cause the tube 640 to fire and thus generate the extra pulse in the units counter 512. The gate 630 is similar to the gate 524 utilized to actuate the one-turn clutch and incorporates a plate resistor 642 sufficiently large to prevent steady-state conduction in the gas tube 640 and a condenser 644 connected from ground to the plate of the gas tube 640 to maintain a transient current in the tube 640 for a short period of time, thus generating the extra pulse which is required. The gates 336 and 342 of Fig. 9 operate and are constructed in the manner here described, and the multivibrator 330 of that figure is substantially the same as the electronic switch 556 here described and used to bias the associated gates. Selective operation of the gate 618 is provided in a similar manner. That is, if the tube 558 of the negative numbers switch 556 has not been pulsed, the tube 560 will be conducting, indicating a negative number, and thus the grid of gas tube 646 will be positively biased a small amount, whereby the additional positive voltage provided by the record pulse through conductor 628 will be sufficient to fire the tube 646 and thus generate a print pulse and shift the ground connections on the heads as described. The delay 522 is provided so that the gates 618 and 630 will have an opportunity to function before the gate 524 actuates the one-turn clutch. Thus before the clutch begins a printing cycle the gate 630 will have fed the extra pulse to the units counter 512 and the gate 618 will have shifted the grounds in the heads. The pulses from the measuring unit 90 are utilized not only to actuate the serially connected counters but also through conductor 648 used to reset the electronic switch 518 to the seriatim connection where tube 540 is conducting and tube 538 is quiescent. Thus at the beginning of each printing cycle and each measuring cycle, electronic switch 518 is reset to bias the right-hand connections to prevent the passage of a pulse and allow passage of pulses through the left-hand circuit for normal series counter operation.

A second commutator 650 is provided having common drive means with the commutator 600 and is utilized as a readout pulse and reset pulse generator. Upon receipt of a pulse from the measuring unit 90, indicating the completion of a measuring cycle and the commencement of a printing cycle, the wiper 652 rotates through one complete cycle and completes circuits periodically between the commutator segments 654 and the circular commutator segment 656. The circular segment 656 is connected to a source of positive voltage, and all of the small segments 654 have a common connection to four parallel connected gas diodes in a pulse shaper 658. The diodes serve to insure a sharp, discrete pulse in combination with associated resistors 659, and further serve to isolate the various counter inputs from one another to prevent undesirable feedback during a measuring cycle. Each revolution of the commutator 650 will produce ten pulses at the common connection of the four diodes and will thus produce ten pulses at the output of each of these diodes which are transmitted through a condenser 660 and applied to the input of the associated counter. The remaining segment 653 on commutator 650 is circumferentially aligned with segment 612 on commutator 600 and serves as a reset circuit. When the wiper 652 engages the segment 653, a positive pulse is applied through conductors 655 and diodes 657 to the nonprint gates 582.

The information which the reference counter stores is received from a separate source as described above and does not represent a continuously variable magnitude but customarily indicates such information as date, time, and aircraft and flight number. This data is fed from a reference data set 130 to the reference data counter 662, where it is stored in a manner identical with the storage of positive numbers in the units, tens, and hundreds counters. The readout pulses are passed from pulse shaper 658 through conductor 664, back to the reference data set 130 and reference data scanner 126 to step the data scanner to sample the various manual inputs which have been established in the reference data channels. The readout pulses are also fed from the reference data scanner 126 back into the reference data counter 662 through conductor 666 to cause the counter 662 to read out in the usual fashion, thus operating a reference gate 564c to cause the reference data head 584 to print in a manner similar to that described above with respect to positive numbers in the units head.

The switches 518 and 556 are well-known bi-stable multivibrators which, by virtue of the cathode-connected condensers 667, will extinguish one of the parallel-connected gas tubes each time the alternate gas tube is triggered. This will occur because of the common plate resistor 668. When both tubes attempt to conduct simultaneously, the drop across the plate resistor 668 is of such magnitude that deionization tends to occur in both the gas tubes. However, the previously conducting gas tube will have a positively charged cathode condenser 667 and thus reduce the voltage present across the associated gas tube causing it to extinguish first, allowing the remaining previously nonconducting gas tube to continue to conduct.

The mechanism 669 for moving the record paper and inked ribbon is pictorially illustrated in Fig. 12. This is merely exemplary of one possible ribbon and paper carriage and is not described in detail, as it is believed clear that any appropriate device may be used. This mechanism forms the front face of the recorder section 88 of Fig. 4 and is removable from the section by three simple clasps 89, whereby a complete unit may be replaced for quick interchange of paper supplies even under flight conditions. The record paper is stored on a supply roll 670 and transported over an idling roll and a driving roll 672. The driving roll has a flexible belt 674 in engagement with a drum 675 disposed at the end of the roll, and the belt 674 is adapted to drive a corresponding drum 676 which is mounted on a common shaft 678 and adapted to drive a take-up roll 680. A lever 682 is pivotally mounted about pin 684 which is mounted in the paper drive housing 686. A slidable lever 688 is secured to the lower end of lever 682 and is adapted to engage a ratchet wheel 690 which is in the fixed relationship with the driving roller 672. A coil spring 692 is provided to maintain the lever 682 in an initial position, and each revolution of the one-turn clutch described with respect to Figs. 9 or 11 will cause the lever 682 to be moved to the left in Fig. 12, and thus cause the driving roll 672 to be stepped one position in the counterclockwise direction and thus reposition the paper 698 to receive a subsequent data reading. In the particular embodiment herein described, the motion between readings is approximately $\frac{1}{32}$nd of an inch, whereby approximately 32 data readings may be recorded per inch of record material. The lever 688 is pivotally mounted to a freely swinging link 694 which is also pivotally mounted to the housing 686 and provides a guide for the operation of link 694.

An inked ribbon 696 is adapted to move transversely across the printing paper immediately above the drive roll 672, whereby the printing arms described with respect to the other figures will engage the inked ribbon 696 to produce inked impressions on the paper 698. A ribbon supply roll 700 and a ribbon take-up roll 702 are mounted in side-by-side relationship, and the take-up roll 702 has a spur gear 704 fixed to its shaft for rotation of the roll. Gear 704 is operated by a dog and ratchet arrangement in which a dog 706 is pivotally mounted on the transversely movable link 688 and adapted to engage a ratchet 708 when the lever 682 is actuated by the one-turn clutch. This is merely illustrative of one possible paper and ink supply and is especially well adapted for use in a portable unit in which it is desirable that a large amount of the recorded data remain visible for inspection. However, one skilled in the art may readily conceive of various types of ribbon and paper supplies.

The record which has been above described in considerable detail is useful for converting data recorded in portable apparatus into a permanent form in any of the conventional forms such as teletype tapes and IBM cards. One particular type of apparatus for accomplishing this conversion will be described with reference to Figs. 13, 14, 15, and 16. In the block diagram of Fig. 13 the observational record 750 is one similar in form to the various unitary decimal digital records described. A source of light is provided above the record 750 comprising generally a flood lamp 752, a lens 754, and a light-restricting slit 756. The lens 754 may be of the conventional parabolic or spherical form or may be of a cylindrical form when utilized with a relatively wide record material requiring a long, thin light beam. A light display from this source is applied to the record 750 which is preferably a lightweight paper or similar material which is translucent and upon which dark effects have been made by the recording apparatus. Thus light-restricting slit 756. The lens 754 may be of the length of the beam at all points where record effects do not appear, but will be absorbed or reflected from the medium at the data effect positions. A second slit 758 may be provided below the record 750 to further limit the light beam and eliminate any stray light, and the light passing through slit 758 will be concentrated through a second lens 760 to strike a photoelectric cell 762. As is well understood, the photoelectric cell will either generate a small voltage proportional to the light received thereby or will exhibit a variable resistance characteristic proportional to the light received. In either event the magnitude of the signal thus generated may be increased by amplifier 764, the output of which is connected to a commutator 766. The amplifier and commutator may be reversed if desired. The output of the commutator in this particular playback apparatus 748 will comprise six parallel channels when utilized with a record such as that shown in Fig. 2 having a reference data channel and a units, tens, and hundreds channel. Each of these data channels will be represented by one output from the commutator 766, and the remaining two outputs will provide a signal to indicate whether the measured data is positive or negative and to generate an initiating pulse to indicate the beginning of a new data sample. All of this apparatus is energized from a power supply 768 which may be of any conventional type and will not be described in greater detail. A switch 770 is provided to control the operation of the power supply 768 and also to energize a motor 772 which will operate the mechanical portions of the playback device 748.

The motor actuates, through an appropriate set of gears 774, a paper drive 776 and a steel tape 778 having a small aperture therein which will transversely scan one row of data effects on the observational record 750. Thus while a long, thin beam of light is available from the light source, the steel tape having a small aperture therein will provide a barrier for all of the light except a small beam having a cross section approximating that of a single data effect. Thus as the steel tape moves across a transverse element of the record 750, it in effect creates a small scanning beam which will produce a series of light and dark pulses on the photocell 762. Each time a data effect is sensed, the photocell will be darkened and a signal will be generated at the output of the amplifier 764. The commutator 766 is driven in synchronism with the paper drive 776 and steel tape 778 by a commutator cycle control 780.

In the particular embodiment here described the commutator 766 has four equal segments disposed in the four quadrants of a circle, each of the segments being electrically connected to one of the outputs 782. By having the commutator 766 rotate in synchronism with the motion of steel tape 778, the pulses resulting from the effects in the reference channel will always appear in one predetermined output channel of the commutator 766, and likewise the pulses corresponding to the effects in each of the data channels will be so categorized. If the commutator 766 and tape 778 are driven from a common shaft, the commutator control 780 may be dispensed with. A separate photocell is utilized to sense the position of the indicia effect to determine whether the data sample is either positive or negative, and this photocell is provided with an independent amplifier and passes through the commutator and utilizes a separate output channel. A small commutator segment will be provided to generate a short pulse at the beginning of each data sample. This will indicate at a recording station or to computing apparatus utilizing the data thus sensed, the commencement of a new data sample and will thus avoid ambiguities.

As shown in Figs. 14 and 15, an observational record 750 is mounted on a supply spool 784 and passing from the supply spool over a driving roll 786 having a plurality of spaced teeth 788 disposed about the circumference of the drive roll along the edges thereof for engagement with spaced holes in the record paper. A takeup roll 790 is mounted parallel to the supply and in spaced relationship thereto, whereby the paper is transported between the driving roll 784 and the takeup roll 790 along a substantially horizontal planar path. A closed steel tape 778 having small rectangular apertures 792 at spaced positions therealong is passed about the record material and lies in juxtaposition to the paper during a portion of its travel. The tape 778 is positioned between two rotatably mounted spools 794 and 796 with axes at a small acute angle to the direction of paper travel. The tape 778 is continuously driven through gears 798 by a small fractional horsepower motor 800. The apertures 792 are spaced apart a sufficient distance to span all of the data contained upon the record 750. In the particular embodiment here described having four data channels, a two-inch spacing between apertures is desirable, each data channel being allowed approximately one-half inch of paper width.

A second gear train 802 is mounted on the shaft 804 of spool 796 and is adapted to drive a paper driving gear train 806 through a flexible coupling 808. The worm gear 810 of the train 806 is not concentrically mounted with the shaft 812, and for this reason the flexible coupling 808 is required. The reason for this nonconcentricity is the fact that the steel tape 778 does not travel in a path normal to the path of paper 750 but is oriented at a small acute angle thereto. By this arrangement the paper 750 may be continuously driven, and a predetermined aperture 792 will scan a line perfectly perpendicular to the direction of paper travel, provided only that the relative speeds of the paper 750 and steel tape 778 are properly chosen. Also mounted on the shaft 804 is an arm 814 supporting a pair of commutator wipers 816 and 818. These wipers periodically engage commutator segments on the face 820 as described above and are driven in synchronism with the steel tape 778 whereby accurate switching between the various commutator segments at the appropriate time for proper data sensing is insured.

Each of the commutator segments is connected by an electrical conductor (not shown) to a jack 822 which will receive a corresponding plug which is associated with any appropriate computing or recording apparatus. As shown in Fig. 15, the flood lamp 752 is mounted above the paper carrier on pedestals 824 and is positionable at various points above the paper surface by adjusting screws 826 which engage slots 828 in the vertical supports. Condensing lenses 754 are here utilized to provide an elongated light beam, but it has been found that the apparatus will function satisfactorily using a light source without the accompanying lenses, provided a source of sufficient intensity is utilized. A photocell 830 is mounted beneath the paper surface within the playback housing 832 and is energized by the light from lamp 752 passing through the aperture 792 in the steel tape 778 and the record paper therebeneath. Each time the aperture 792 is disposed above a printed effect on the paper, the light supply is cut off to the photocell 830, generating an electrical pulse which is transmitted through the appropriate amplifier and commutator segment.

A second photocell 834 is mounted to one of the vertical supports 824 and so positioned in angular relationship to the paper surface that it will receive reflected light from the flood lamp 752 and the paper 750. The photocell 834 will be positioned in alignment with one of the indicia indicating whether the data recorded is positive or negative, such as the indicia 68 of Fig. 3. A flexible belt 836 interconnects appropriate pulleys 838 and 840 on the supply and takeup spools, whereby they are driven in such a manner that the paper disposed therebetween will be maintained taut.

Figure 16:
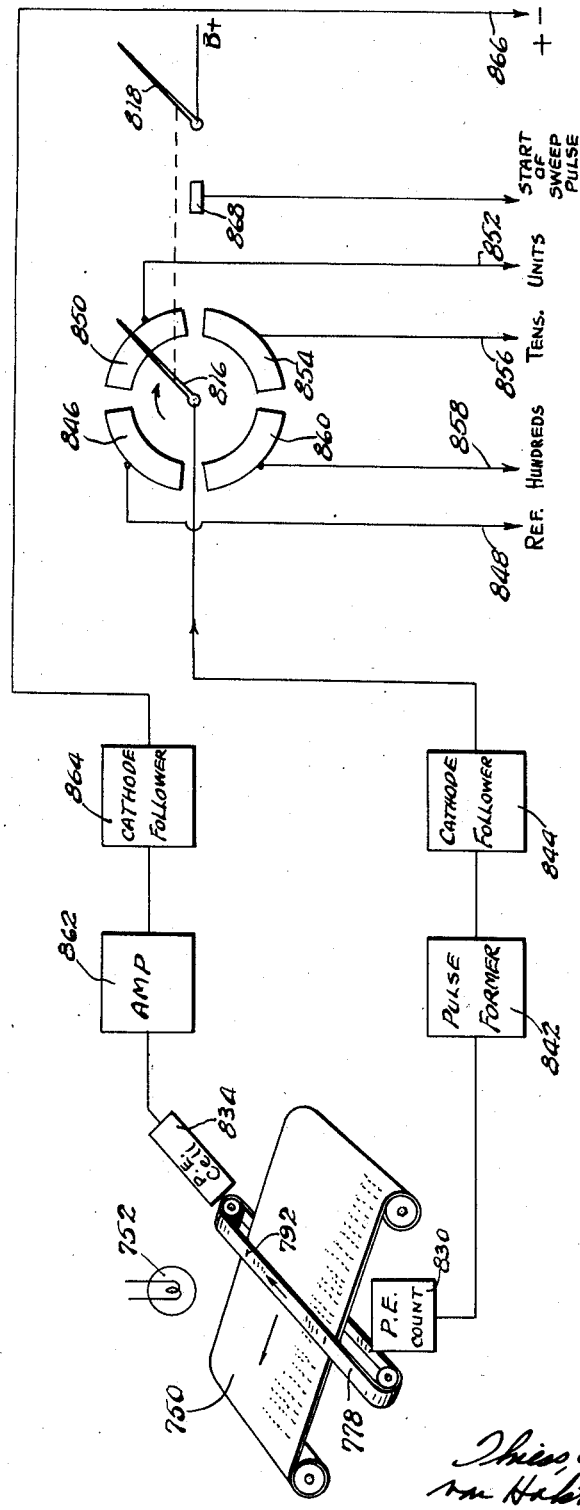
Fig. 16 is a schematic block diagram of the playback unit and associated circuits illustrated in Figs. 14 and 15.

Referring to Fig. 16, the paper record 750 and transversely moving steel tape 778 are diagrammatically shown. There it can be seen that by synchronizing the motion of the paper and tape indicated by the direction of arrows, the slit 792 will scan the record contained in one transverse row which defines one single data element. The light source 752 shines through the slit 792 and through the small portion of the paper 750 disposed thereunder to energize a photoelectric counting cell 830. A second photocell 834 angularly mounted to detect whether the particular data sample is positive or negative is also shown. The counting cell 830 is connected through a conductor to a pulse forming circuit 842 which shapes the output of the photoelectric cell into a steep-sided electrical pulse. This pulse is then applied to a cathode follower 844 which will provide a desirable low impedance output to the wiper 816 of the continuously rotatable commutator. The wiper 816 and a second wiper 818 mounted for common movement are driven in synchronism with the paper drive and steel tape drive as described. As here shown, four segments are provided on the commutator to be engaged by the wiper 816. The first segment 846 will be engaged by the wiper 816 while the reference channel of the record 750 is being scanned. Thus pulses sensed at that time will be appropriately shaped and amplified in the circuit just described and available at the reference output 848. As the steel tape proceeds across the record 750, the wiper 816 rotates to engage commutator segment 850 which will similarly provide a series of pulses at the hundreds output 852. Continued operation will cause the wiper 816 to rotate to engage commutator segment 854 to provide a series of pulses corresponding to the tens digit of the data recorded which is made available at the tens output 856, and the fourth quadrant of wiper rotation will provide the sensed output at a units terminal 858 which is connected to a fourth commutator segment 860. The pulses sensed by angularly mounted photocell 834 are amplified in the circuit shown by block 862, and the pulse output from the amplifier 862 is applied to a cathode follower 864 which will produce a voltage at the polarity output 866, the presence of which will indicate a number of known polarity, either positive or negative, depending upon which edge of a data column is sensed. A second wiper 818 rotating in synchronism with wiper 816 will engage a small commutator segment 868 at the end of each revolution on the commutator to produce a pulse of positive voltage which will control the sequential operation of voltage energized from this playback device.

The data which has now been set up in this manner may be utilized as a unitary decimal digital record as it here exists, or it may be fed into three parallel decimal counters which may be read out in series to produce a unitary registration of the data element. By this technique the total number of pulses then represents the data contained on the record 750 at a predetermined position with arithmetic accuracy. Once the record is in this unitary form whereby the total number of pulses represents the magnitude of the data, it is believed clear that any record form may be generated therefrom in either analogue or digital form.

While several possible recorders and record forms and one possible playback device have here been described, it is believed clear from the disclosure above that the concepts herein taught are in no way limited by the apparatus disclosed but are of a basic nature by which an entirely new field of data recording and processing will develop. The record generated by the apparatus described may also readily be created by manual means or by an unlimited variety of devices. This record has many advantages over any heretofore known, especially the compactness, arithmetic accuracy, and visual meaning which it provides.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. In a device for recording intelligence, a plurality of effect-producing means adapted to be individually operated to a producing position by the correlated actuation of at least two control means, a first control means to engage said producing means individually in a predetermined time sequence and to sequentially move said producing means between the producing position and a nonproducing position, and at least one second control means shiftable between a position to interfere with the movement of said producing means and a noninterfering position at times determined by the intelligence to be recorded.

2. In a device for recording intelligence, a plurality of printing means adapted to be individually operated to a printing position by the correlated actuation of two control means, a first control means adapted to engage said printing means individually in a predetermined time sequence and to sequentially move said printing means toward the printing position and a second control means shiftable between a position to interfere with the movement of said printing means toward the printing position and a noninterfering position at a time determined by the intelligence to be recorded.

3. In a recording device, a plurality of printing members pivotally mounted on a common axis, a rotatable shaft, a plurality of cam members fixed to said shaft adapted to sequentially engage corresponding ones of said printing members to move them individually to a printing position, and control means shiftable between a position to interfere with the movement of said printing members toward the printing position and a noninterfering position at a time determined by the intelligence to be recorded.

4. In a device for recording intelligence, a plurality of printing members pivotally mounted on a common axis, a control means shiftable to interfere with the movement of said printing members toward a printing position as determined by the intelligence to be recorded, a rotatable shaft, a plurality of cam members fixed to said shaft adapted to sequentially engage said printing members to cause them individually to move to the printing position, and means to reset the control means at the completion of each sequence of said cam members.

5. In a device for recording intelligence, a recording medium, a plurality of printing members pivotally mounted on a common axis adapted to engage said recording medium, shiftable interference means to control the movement of said printing members toward said recording medium, electromagnetic means adapted to shift said interference means between a nonprinting and a printing position at a time determined by the intelligence to be recorded, a rotatable shaft, and a plurality of cam means fixed to said shaft adapted to sequentially engage said printing members and cause them to record a plurality of effects on the recording medium, the number of effects recorded to be determined by the portion of a complete time sequence of said cams which remains at the instant that the electromagnetic means is actuated.

6. In a device for recording intelligence, a recording medium, a plurality of printing members pivotally mounted on a common axis adapted to engage said recording medium, shiftable interference means to control the movement of said printing members toward said recording medium, electromagnetic means adapted to shift said interference means between a nonprinting and a printing position at a time determined by the intelligence to be recorded, a rotatable shaft, a plurality of cam means fixed to said shaft adapted to sequentially engage said printing members and cause them to record a plurality of effects on the recording medium, the number of effects recorded to be determined by the portion of the complete time sequence of said cams which remains at the instant that the electromagnetic means is actuated, and means to reset said interference means upon completion of a time sequence of said cam members.

7. In a device for recording data, a strip of recording medium intermittently movable in the longitudinal direction, a plurality of printing members pivotally mounted on a common axis adapted to printingly engage said recording medium to periodically form parallel rows of effects substantially normal to the direction of tape travel, interference means to control the movement of said printing members toward said recording medium, electromagnetic means adapted to shift said interference means between a nonprinting and a printing position at a time determined by the intelligence to be recorded, a rotatable shaft, and a plurality of cam means fixed to said shaft adapted to sequentially engage said printing members and cause them to record a plurality of effects on the recording medium, the number of effects recorded to be determined by the portion of a complete time sequence of said cams which remains at the instant that the electromagnetic means is actuated.

8. In a device for recording data; a recording medium; a plurality of printing units; each unit comprising, a plurality of printing members pivotally mounted on a common axis adapted to engage said recording medium, interference means to control the movement of said printing member toward said recording medium, electromagnetic means adapted to shift said interference means between a nonprinting and a printing position at a time determined by the intelligence to be recorded, a rotatable shaft, a plurality of cam means fixed to said shaft adapted to sequentially engage said printing members and cause them to record a plurality of marks on the recording medium, the number of marks recorded to be determined by the portion of a complete time sequence of said cams which remains at the instant that the electromagnetic means is actuated, and means to reset said interference means upon completion of a time sequence of said cam members; and means to selectively energize the electromagnetic means of said printing units to form a unitary decimal digital record upon said recording medium.

9. In a device for recording data; a recording medium;

a plurality of printing units; each unit comprising, a plurality of printing members pivotally mounted on a common axis adapted to engage said recording medium, interference means to control the movement of said printing members toward said recording medium, electromagnetic means adapted to shift said interference means between a nonprinting and a printing position at a time determined by the intelligence to be recorded, a rotatable shaft, a plurality of cam means fixed to said shaft adapted to sequentially engage said printing members and cause them to record a plurality of effects on the recording medium, the number of effects recorded to be determined by the portion of a complete time sequence of said cams which remains at the instant that the electromagnetic means is actuated, and means to reset said interference means upon completion of a time sequence of said cam members; means interconnecting the shafts of the various units to rotate said shafts in synchronism; and means to selectively energize the electromagnetic means of said printing units to form a unitary decimal digital record upon said recording medium.

10. A system for processing data samples wherein each sample processed by said system is expressed in the form of uniform effects segregated into groups such that each group represents a digit of a number related to the said data sample in a predetermined manner, the said system comprising: a source of data; means coupled to the said source and responsive to the said data for generating a series of periodic signals, the number of signals in one of said series less than a predetermined number being representative of, and inversely proportional to, the magnitude of data of one polarity, and the number of signals in another of said series greater than the said predetermined number being representative of, and directly proportional to, the magnitude of data of the opposite polarity; means coupled to the said generating means and responsive to the said signals for producing detectable groups of effects along a record medium whereby the number of effects in each group indicates the number of units in a digit of a number representing an instantaneous magnitude of the said data and such that the said groups symbolize the said magnitude-representative number; means disposed in cooperative relation with respect to the said record medium for reproducing signals from the said detectable effects; and means coupled to the said reproducing means for utilizing the said reproduced signals.

11. In a device for recording data; a recording medium; a plurality of printing units; each unit comprising, a plurality of printing members pivotally mounted on a common axis adapted to engage said recording medium, interference means to control the movement of said printing members toward said recording medium, electromagnetic means adapted to shift said interference means between a nonprinting and a printing position at a time determined by the intelligence to be recorded, a rotatable shaft, a plurality of cam means fixed to said shaft adapted to sequentially engage said printing members and cause them to record a plurality of effects on the recording medium, the number of effects recorded to be determined by the portion of a complete time sequence of said cams which remains at the instant that the electromagnetic means is actuated, and electromagnetic means to reset said interference means upon completion of a time sequence of said cam members; means interconnecting the shafts of the various units to rotate said shafts in synchronism; and means to selectively energize the electromagnetic means of said printing units to form a unitary decimal digital record upon said recording medium.

12. In a device for recording data on a recording medium, a plurality of printing units; each unit comprising a plurality of printing means adapted to be individually operated to a printing position by the correlated actuation of two control means, a first control means adapted to engage said printing means individually in a predetermined time sequence and to sequentially move said printing means toward the printing position, a second control means shiftable between a position to interfere with the movement of said printing means toward the printing position and a noninterfering position at a time determined by the intelligence to be recorded; and means to selectively actuate said printing units to form a unitary digital record upon said recording medium.

13. In a device for recording data on a recording medium, a plurality of printing units; each unit comprising a plurality of printing means adapted to be individually operated to a printing position by the correlated actuation of two control means, a first control means adapted to engage said printing means individually in a predetermined time sequence and to sequentially move said printing means toward the printing position, a second control means shiftable between a position to interfere with the movement of said printing means toward the printing position and a noninterfering position at a time determined by the intelligence to be recorded; sensing means to determine the magnitude of such data; and means to selectively actuate said printing units to form a unitary digital record upon said recording medium in response to the data contained in said sensing means.

14. In a device for recording data on a recording medium, a plurality of printing units; each unit comprising a plurality of printing means adapted to be individually operated to a printing position by the correlated actuation of two control means, a first control means adapted to engage said printing means individually in a predetermined time sequence and to sequentially move said printing means toward the printing position, a second control means shiftable between a position to interfere with the movement of said printing means toward the printing position and a noninterfering position at a time determined by the intelligence to be recorded; sensing means to determine the magnitude of such data; means for separating said magnitude into a multidigital form wherein an independent signal represents each digit; and means to selectively actuate said printing units to form a unitary digital record upon said recording medium, each of said units responding to the signal representing one digit of said multidigital form.

15. In a device for recording data on a recording medium, a plurality of printing units; each unit comprising a plurality of printing means adapted to be individually operated to a printing position by the correlated actuation of two control means, a first control means adapted to engage said printing means individually in a predetermined time sequence and to sequentially move said printing means toward the printing position, a second control means shiftable between a position to interfere with the movement of said printing means toward the printing position and a noninterfering position at a time determined by the intelligence to be recorded; sensing means to determine the magnitude of such data; means for separating said magnitude into a multidigital form; means responsive to said sensing means to print an indicia indicating the presence of a data sample and its polarity; and means to selectively actuate the second control means of said printing units to form a unitary digital record upon said medium, each of said units responding to one of the digits of said multidigital form.

16. In a device for recording data; a recording medium; a plurality of printing units; each unit comprising, a plurality of printing members pivotally mounted on a common axis adapted to engage said recording medium, interference means to control the movement of said printing members toward said recording medium, electromagnetic means adapted to shift said interference means between a nonprinting and a printing position at a time determined by the intelligence to be recorded, a rotatable shaft, a plurality of cam means fixed to said shaft adapted to sequentially engage said printing members and cause them to record a plurality of effects on the recording medium, the number of effects recorded to be determined by the portion of a complete time sequence of said cams which remains at the instant that the electromagnetic means is actuated, and means to reset said interference means upon completion of a time sequence of said cam members; means interconnecting the shafts of the various units to rotate said shafts in synchronism; sensing means to determine the magnitude of such data; means for separating said magnitude into a multidigital form; means responsive to said sensing means to print an indicia indicating the presence of a data sample and its polarity; and means to selectively actuate the electromagnetic means of said printing units to form a unitary digital record upon said medium, each of said units responding to one of the digits of said multidigital form.

17. Apparatus for recording a specific value of data on a medium comprising means for generating a data signal as a series of electric impulses, each impulse representing a unitary increment of such data, means for reducing said series of impulses to a digital form in which successive groups of impulses represent successive digital positions, the number of impulses representing the value of the digit in the corresponding digital position, a plurality of printing means adapted to be individually operated to a printing position by the correlated actuation of at least two control means, a first control means adapted to sequentially engage said printing means individually in a predetermined sequence and to sequentially move said printing means toward a printing position and at least one second control means shiftable between a position to interfere with the movement of said printing means and a noninterfering position, each of said second control means being actuated from one of the groups of impulses in the digital form.

18. Apparatus for recording on a medium in unitary decimal digital form a specific data value varying between equal predetermined negative and positive limits above and below a zero value, said apparatus comprising sensing means for generating an electric signal representing such value above the negative limit, means for generating a number of impulses corresponding to the magnitude of said signal, decimal counters normally connected seriatim to receive said series of impulses, the capacity of said counters being one-half the maximum number of impulses, means to sense the zero data value which corresponds to a number of pulses equal to the capacity of said counters, means for switching said counters to independent outputs, a source of timed impulses applied to said counters when connected to said independent outputs, recording means associated with each of said counters actuated in synchronism with said source of timed impulses to produce an effect for each impulse of said source, and a plurality of interference means, each actuated by the independent output of one of said counters to control the actuation of said recording means when the associated counter is connected to the independent output and the sum of impulses in said counter equals ten.

19. Apparatus for recording on a medium in unitary decimal digital form a specific data value varying between equal predetermined negative and positive limits above and below a zero value, said apparatus comprising sensing means for generating an electric signal representing such value above the negative limit, means for generating a number of impulses corresponding to the magnitude of said signal, decimal counters normally connected seriatim to receive said series of impulses, the capacity of said counters being one-half the maximum number of impulses, means to sense the zero data value which corresponds to a number of pulses equal to the capacity of said counters, means for switching said counters to independent outputs, a source of timed impulses applied to said counters when connected to said independent outputs, recording means associated with each of said counters actuated in synchronism with said source of timed impulses to produce an effect for each impulse of said source, and a plurality of interference means, each actuated by the independent output of one of said counters and the zero sensing means to permit the actuation of said recording means for data values on one side of the zero value and prevent said actuation on the other side of said zero data value whenever the associated counter is connected to the independent output and the sum of impulses in said counter equals ten.

20. Apparatus for recording on a medium in unitary decimal digital form a specific data value varying between equal predetermined negative and positive limits above and below a zero value, said apparatus comprising sensing means for generating an electric signal representing such value above the negative limit, means for generating a number of impulses corresponding to the magnitude of said signal, decimal counters normally connected seriatim to receive said series of impulses, the capacity of said counters being one-half the maximum number of impulses, means to sense the zero data value which corresponds to a number of pulses equal to the capacity of said counters, means for inserting an extra impulse in said serially connected counters when the data value to be recorded is positive, means for switching said counters to independent outputs, a source of timed impulses applied to said counters when connected to said independent outputs, recording means associated with each of said counters actuated in synchronism with said source of timed impulses to produce an effect for each impulse of said source, and a plurality of interference means, each actuated by the independent output of one of said counters to control the actuation of said recording means when the associated counter is connected to the independent output and the sum of impulses in said counter equals ten.

21. In a system for processing data samples, a recorder wherein a representation of each data sample is recorded in the form of uniform effects segregated into groups such that each group represents a digit of a number related to the said data sample in a predetermined manner, the said recorder comprising: means for generating series of periodic electrical signals whereby series having a number of signals less than a predetermined datum number are representative of, and vary inversely with, the magnitude of samples of one polarity, and series having a number of signals greater than a predetermined datum number are representative of, and vary directly with, the magnitude of samples of the opposite polarity; means coupled to the said generating means and responsive to each of said series for producing detectable groups of effects along a record medium whereby the number of effects in each group indicates the number of units in a digit of a number expressing the unitized magnitude of the data sample represented by said series, and the said groups are arranged in a manner corresponding to the position of digits in the said magnitude-representative number.

22. A recorder as represented in claim 21 including means coupled to the said generating means and the said producing means for impressing polarity-representative effects to said record medium in proximity to said number-representative groups.

23. A recorder as represented in claim 21 wherein the said generating means comprises: an output terminal; a source of periodic electrical signals; means for developing a voltage analogous to data to be processed; and means coupled to said source, said output terminal, and said voltage-developing means for passing said electrical signals to said output terminal, said passing means further including means operative in response to said voltage for blocking passage of said electrical signals whenever the number of said signals is at least proportional to an instantaneous magnitude of said data.

24. A recorder as represented in claim 23 wherein the said passing means comprises: an alternating-current bridge having one pair of opposite terminals coupled to said source, the said bridge including in one branch the said means for developing a voltage analogous to the said data and in an opposing branch means for producing a voltage increasing linearly from a datum magnitude at intervals corresponding to the data sampling frequency such that the periodic output signal appearing at the other pair of opposite terminals of said bridge reverses in phase as the said linearly-increasing voltage increases beyond the magnitude where bridge balance occurs; a phase-sensitive gating circuit coupled to the said other pair of opposite bridge terminals for passing the said periodic electrical signals when the said output signals have a first phase and blocking the said electrical signals when the said output signals have a second phase, such that the number of periodic signals passing the said gate is at least proportional to the magnitude of the sampled data at the instant bridge balance occurs.

25. A recorder as represented in claim 21 further comprising means coupled to the said generating means and the said producing means for programming operation of the two last-mentioned means to occur in mutually-exclusive cycles.

26. A recorder as represented in claim 25 wherein the said means for producing detectable groups of effects along a record medium comprises: $n$ decade counters coupled in series relation to the said generating means for storing electrical signals, the symbol $n$ representing the number of digits in the number of signals in said series; $n$-recording heads where $n$ represents the number of said digits; a source of read-out pulses coupled to the said programming means; means coupled to the said programming means and to the said counters for coupling the output terminals of each of said counters to one of the said recording heads at the end of equal time intervals; means coupled to the said programming means, to the said counters, to the recording heads and to the said read-out pulse source for actuating the said recording heads simultaneously with the said read-out pulse source whenever the number of electrical signals in a series is less than the said datum number such that a data sample of negative polarity is represented thereby, and for actuating the said recording heads in response to full-scale pulses from the said counter whenever the number of signals in a series is greater than the datum number such that a data sample of positive polarity is represented thereby; and means disposed in cooperative relation with respect to said recording heads for registering the aforesaid groups of detectable effects.

27. A recorder as represented in claim 26 wherein the capacity of said counters when coupled in series relation is equal to said datum number minus one.

28. A recorder as represented in claim 27 further comprising means coupled to said programming means for inserting an extra pulse into said counters to eliminate the effect of the zero position between negative and positive ranges of digits.

References Cited in the file of this patent

UNITED STATES PATENTS

| | | |
|---|---|---|
| 1,812,620 | Braitmayer | June 30, 1931 |
| 2,194,305 | Kirschler et al. | Mar. 19, 1940 |
| 2,229,696 | Engst | Jan. 28, 1941 |
| 2,508,953 | Knutsen | May 23, 1950 |
| 2,519,537 | Barnes | Aug. 22, 1950 |
| 2,524,299 | Sutherland | Oct. 3, 1950 |
| 2,535,125 | Ferry | Dec. 26, 1950 |
| 2,600,817 | Victoreen | June 17, 1952 |
| 2,650,024 | Ferrin | Aug. 25, 1953 |
| 2,759,784 | Burke | Aug. 21, 1956 |